United States Patent
Wei

(10) Patent No.: US 11,750,926 B2
(45) Date of Patent: Sep. 5, 2023

(54) VIDEO IMAGE STABILIZATION PROCESSING METHOD AND ELECTRONIC DEVICE

(71) Applicant: Honor Device Co., Ltd., Shenzhen (CN)

(72) Inventor: Qiuyang Wei, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

(21) Appl. No.: 17/756,347

(22) PCT Filed: Sep. 9, 2021

(86) PCT No.: PCT/CN2021/117504
§ 371 (c)(1),
(2) Date: May 23, 2022

(87) PCT Pub. No.: WO2022/057723
PCT Pub. Date: Mar. 24, 2022

(65) Prior Publication Data
US 2022/0417433 A1    Dec. 29, 2022

(30) Foreign Application Priority Data
Sep. 18, 2020 (CN) .......................... 202010988444.6

(51) Int. Cl.
*H04N 23/68* (2023.01)
(52) U.S. Cl.
CPC ....... *H04N 23/683* (2023.01); *H04N 23/6812* (2023.01); *H04N 23/6845* (2023.01)

(58) Field of Classification Search
None
See application file for complete search history.

(56) References Cited

U.S. PATENT DOCUMENTS

| | | | |
|---|---|---|---|
| 9,313,409 B2 | 4/2016 | Kim et al. | |
| 9,503,645 B2* | 11/2016 | Ju | H04N 9/79 |
| 10,244,175 B2* | 3/2019 | Khoe | H04N 23/63 |
| 11,140,327 B2* | 10/2021 | Huang | H04N 23/45 |
| 2011/0013896 A1 | 1/2011 | Hideo | |
| 2012/0002060 A1 | 1/2012 | Suguru | |

(Continued)

FOREIGN PATENT DOCUMENTS

| | | |
|---|---|---|
| CN | 101964870 A | 2/2011 |
| CN | 106254771 A | 12/2016 |

(Continued)

OTHER PUBLICATIONS

Wikipedia, "Image stabilization", https://en.wikipedia.org/wiki/Image_stabilization, Jun. 15, 2020, 11 pages.

*Primary Examiner* — Cynthia Segura
(74) *Attorney, Agent, or Firm* — Slater Matsil, LLP

(57) ABSTRACT

A video image stabilization processing method and an electronic device are provided and related to the field of electronic technologies. The method includes: in a multi-view recording mode, cropping, by using a target object as a center, a video picture captured by a front-facing camera or a video picture with a large zoom ratio, to achieve picture stabilization; and compensating another video picture according to a motion feature of an electronic device, to achieve picture stabilization.

20 Claims, 11 Drawing Sheets

(56) References Cited

U.S. PATENT DOCUMENTS

| | | | |
|---|---|---|---|
| 2012/0105654 A1 | 5/2012 | Vivek et al. | |
| 2012/0268641 A1* | 10/2012 | Kazama | H04N 23/673 |
| | | | 348/E5.051 |
| 2013/0076921 A1 | 3/2013 | Christopher et al. | |
| 2013/0235224 A1 | 9/2013 | Minwoo et al. | |
| 2015/0365593 A1 | 12/2015 | Hirotaka et al. | |
| 2018/0241961 A1 | 8/2018 | Younhwa et al. | |
| 2019/0082101 A1* | 3/2019 | Baldwin | H04N 23/62 |
| 2022/0159183 A1 | 5/2022 | Yuanyou et al. | |
| 2022/0394190 A1* | 12/2022 | Cui | H04N 23/632 |

FOREIGN PATENT DOCUMENTS

| | | |
|---|---|---|
| CN | 106385541 A | 2/2017 |
| CN | 110072070 A | 7/2019 |
| CN | 110636223 | 12/2019 |
| CN | 110717576 A | 1/2020 |
| CN | 110830704 A | 2/2020 |
| CN | 111083557 A | 4/2020 |
| CN | 111246089 A | 6/2020 |
| CN | 111614869 A | 9/2020 |
| EP | 2871832 B1 | 3/2018 |
| JP | 2003289470 A | 10/2003 |
| JP | 2006080969 A | 3/2006 |
| WO | 2018205902 A1 | 11/2018 |

\* cited by examiner

VIDEO IMAGE STABILIZATION PROCESSING METHOD AND ELECTRONIC DEVICE

CROSS-REFERENCE TO RELATED APPLICATIONS

This application is a national stage of International Application No. PCT/CN2021/117504, filed on Sep. 9, 2021, which claims priority to Chinese Patent Application No. 202010988444.6, filed on Sep. 18, 2020. The disclosures of the aforementioned applications are hereby incorporated by reference in their entireties.

TECHNICAL FIELD

This application relates to the field of electronic technologies, and in particular, to a video image stabilization processing method and an electronic device.

BACKGROUND

Keeping a video picture stable is a major requirement for a video recording function. However, when a photographer holds an electronic device for video recording, it is difficult for the user to avoid a hand shake (including a shake when the hand is still, and a hand shake during a camera movement). Therefore, an image stabilization processing method for videos is particularly important. Currently, the user may externally add an image stabilization device (such as a stabilizer) to reduce the amplitude of the hand shake of the user. However, externally adding the image stabilization device increases a carrying burden of the user.

In addition, the industry may alternatively build an optical image stabilization (optical image stabilization, OIS) device in an electronic device to achieve an effect similar to an external stabilizer and keep pictures stable. However, the built-in OIS device increases a size and costs of a camera, and a set of OIS devices can cover only one camera. When the electronic device has a plurality of cameras, a set of OIS devices are generally not provided for each camera separately.

In addition, the industry may alternatively use an electronic image stabilization method. That is, an inertial measurement unit (inertial measurement unit, IMU) such as a gyroscope or an accelerometer is built in an electronic device. A motion feature of the electronic device is predicted through data of the IMU to correspondingly compensate a video picture and achieve a picture stabilization effect. However, in some multi-view video recording scenarios such as a dual-view video recording scenario, the existing electronic device image stabilization solutions cannot keep a plurality of video pictures stable.

SUMMARY

This application provides a video image stabilization processing method and an electronic device, to keep a plurality of video pictures stable.

To achieve the foregoing objective, embodiments of this application provide the following technical solutions.

According to a first aspect, a video image stabilization processing method is provided, applicable to an electronic device including a camera, the electronic device including a first camera and a second camera, and the method including: receiving a first operation; displaying a first viewfinder and a second viewfinder in response to receiving the first operation, where the first viewfinder is configured to display a first image acquired by the first camera, and the second viewfinder is configured to display a second image acquired by the second camera; cropping, by using a target object in a first original image acquired by the first camera as a center, the first original image to obtain the first image; and cropping, by using a position to which a center of a second original image acquired by the second camera is moved in a first direction by a first distance as a center, the second original image to obtain the second image, where the first direction and the first distance are determined according to a motion feature of the electronic device; and the first camera is a front-facing camera, and the second camera is a rear-facing camera; or the first camera is a telephoto camera, and the second camera is a middle-focus camera or a short-focus camera; or the first camera and the second camera are the same camera, and a zoom ratio of the first image is greater than a zoom ratio of the second image.

That is, different image stabilization solutions are used for different video pictures acquired by the electronic device. An image stabilization method of performing compensation according to the motion feature of the electronic device is used for a video picture (that is, the second original image acquired by the second camera) in which a photographed scenery is relatively far away from the electronic device or of which a zoom ratio is relatively small, and a solution of cropping with a target object as a center is used for a video picture (that is, the first original image acquired by the first camera) in which a photographed portrait is relatively close to the electronic device or of which a zoom ratio is relatively large, thereby ensuring the stability of a plurality of video pictures.

In addition, a picture displayed in the first viewfinder is obtained by cropping an acquired original image with the target object as a center, that is, the target object is located at a center position of the picture in the first viewfinder, and a user does not need to deliberately adjust the electronic device. Therefore, the user may focus on a scenery recorded in the second viewfinder and track and record a scenery desired to photograph, thereby improving the quality of a recorded picture and a comfort level of recording for the user.

In a possible implementation, a size of the first viewfinder and a size of the second viewfinder are the same or different.

In a possible implementation, the cropping, by using a target object in a first original image acquired by the first camera as a center, the first original image to obtain the first image includes: cropping, by using the target object in the first original image acquired by the first camera as a center, the first original image to obtain a third image; adjusting a zoom ratio corresponding to the first viewfinder according to the third image and the size of the first viewfinder; and performing zoom processing according to an adjusted zoom ratio of the first viewfinder and the third image, to obtain the first image.

That is, after the first original image acquired by the first camera is cropped by using the target object as a center, zoom processing may be further performed on an image after cropping. For example, when an image of the target object is relatively small, the zoom ratio may be increased so that the first viewfinder can display the target object more clearly.

In a possible implementation, after the cropping, by using a target object in a first original image acquired by the first camera as a center, the first original image to obtain the first image, the method includes: cropping, by using the target object in the first original image acquired by the first camera as a center, the first original image to obtain the first image; and adjusting the size of the first viewfinder according to a size of the first image.

For example, when the first image including the target object is relatively small, the size of the first viewfinder may be reduced. In this way, the second viewfinder can display more picture content.

In a possible implementation, the method further includes: automatically determining, according to the first original image acquired by the first camera, the target object in the first original image; or determining the target object in the first original image according to a selection operation of a user.

In a possible implementation, the target object includes one or more faces.

In a possible implementation, the cropping, by using a target object in a first original image acquired by the first camera as a center, the first original image to obtain the first image further includes: segmenting, by using an image segmentation technology, the first original image acquired by the first camera into a fourth image and a fifth image, where the fourth image is an image of the target object, and the fifth image is an image that does not include the target object in the first original image; cropping the fourth image by using the target object in the fourth image as a center, to obtain a sixth image; and cropping the fifth image by using a position to which a center of the fifth image is moved in the first direction by the first distance as a center, to obtain a seventh image; and combining the sixth image and the seventh image to obtain the first image.

When the first camera is a front-facing camera, an original image acquired by the front-facing camera includes a face and a background. The face is generally relatively close to the mobile phone, and the background is generally relatively far away from the mobile phone. In some scenarios, a solution of performing cropping by only using the face as a center may cause poor background stability. Therefore, it is necessary to consider the stability of both the face and the background. In some examples, stability weights may be set for the face and the background. For example, in combination with a proportion of the face (or a human body) in the original image (or the image after cropping), weights of the stability of the face, the stability of the human body, and the stability of the background are matched. For example, when an area of the face in the original image reaches a preset ratio (for example, 60% or higher), the weight of the stability of the face is higher. That is, cropping is performed mainly centered on the face, and the stability of the background is not considered or less considered. When the area of the face in the original image does not reach the preset ratio, the weight of the stability of the background is higher. That is, cropping is performed after a cropping center is moved in an opposite direction of a movement direction of the mobile phone by a corresponding distance, and the stability of the face is not considered or less considered. In some other examples, a face (or a human body) in each image frame may be alternatively separated from a background, and different image stabilization solutions are respectively used for processing the face (or the human body) and the background, and two processed images are then synthesized to obtain a front-facing video with a stable face and a stable background.

In a possible implementation, the electronic device is equipped with an inertial measurement unit (inertial measurement unit, IMU), and the method further includes: determining the motion feature of the electronic device according to data of the IMU, and determining the first direction and the first distance according to the motion feature of the electronic device.

In a possible implementation, the second camera is further equipped with an optical image stabilization (optical image stabilization, OIS) device, and the determining the motion feature of the electronic device according to data of the IMU, and determining the first direction and the first distance according to the motion feature of the electronic device includes: determining the motion feature of the electronic device according to the data of the IMU, and determining the first direction and the first distance according to the motion feature of the electronic device and data of the OIS device.

Because an image in the first viewfinder is cropped by using the target object as a center, and the target object is generally located in a central region of the first viewfinder, the first camera may not be equipped with an OIS device. An OIS device (such as a micro gimbal device) may be added to the rear-facing camera. In combination with the OIS device and a predicted motion feature of the mobile phone, a picture in the second viewfinder is compensated.

In a possible implementation, the first operation is any one of an operation of the user on a specific control, inputting a specific speech command, and performing a preset air gesture.

According to a second aspect, an electronic device is provided, including: a processor, a memory, a touch screen, a first camera, and a second camera, where the memory, the touch screen, the first camera, and the second camera are coupled to the processor, the memory is configured to store computer program code, the computer program code includes computer instructions, and the processor, when reading the computer instructions from the memory, causes the electronic device to perform the following operations: receiving a first operation; displaying a first viewfinder and a second viewfinder in response to receiving the first operation, where the first viewfinder is configured to display a first image acquired by the first camera, and the second viewfinder is configured to display a second image acquired by the second camera; cropping, by using a target object in a first original image acquired by the first camera as a center, the first original image to obtain the first image; and cropping, by using a position to which a center of a second original image acquired by the second camera is moved in a first direction by a first distance as a center, the second original image to obtain the second image, where the first direction and the first distance are determined according to a motion feature of the electronic device; and the first camera is a front-facing camera, and the second camera is a rear-facing camera; or the first camera is a telephoto camera, and the second camera is a middle-focus camera or a short-focus camera; or the first camera and the second camera are the same camera, and a zoom ratio of the first image is greater than a zoom ratio of the second image.

In a possible implementation, a size of the first viewfinder and a size of the second viewfinder are the same or different.

In a possible implementation, the cropping, by using a target object in a first original image acquired by the first camera as a center, the first original image to obtain the first image includes: cropping, by using the target object in the first original image acquired by the first camera as a center, the first original image to obtain a third image; adjusting a zoom ratio corresponding to the first viewfinder according to the third image and the size of the first viewfinder; and performing zoom processing according to an adjusted zoom ratio of the first viewfinder and the third image, to obtain the first image.

In a possible implementation, after the cropping, by using a target object in a first original image acquired by the first camera as a center, the first original image to obtain the first image, the electronic device further performs: cropping, by using the target object in the first original image acquired by the first camera as a center, the first original image to obtain the first image; and adjusting the size of the first viewfinder according to a size of the first image.

In a possible implementation, the electronic device further performs: automatically determining, according to the first original image acquired by the first camera, the target object in the first original image; or determining the target object in the first original image according to a selection operation of a user.

In a possible implementation, the target object includes one or more faces.

In a possible implementation, the cropping, by using a target object in a first original image acquired by the first camera as a center, the first original image to obtain the first image further includes: segmenting, by using an image segmentation technology, the first original image acquired by the first camera into a fourth image and a fifth image, where the fourth image is an image of the target object, and the fifth image is an image that does not include the target object in the first original image; cropping the fourth image by using the target object in the fourth image as a center, to obtain a sixth image; and cropping the fifth image by using a position to which a center of the fifth image is moved in the first direction by the first distance as a center, to obtain a seventh image; and combining the sixth image and the seventh image to obtain the first image.

In a possible implementation, the electronic device is equipped with an inertial measurement unit (inertial measurement unit, IMU), and the electronic device further performs: determining the motion feature of the electronic device according to data of the IMU, and determining the first direction and the first distance according to the motion feature of the electronic device.

In a possible implementation, the second camera is further equipped with an optical image stabilization (optical image stabilization OIS) device, and the determining the motion feature of the electronic device according to data of the IMU, and determining the first direction and the first distance according to the motion feature of the electronic device includes: determining the motion feature of the electronic device according to the data of the IMU, and determining the first direction and the first distance according to the motion feature of the electronic device and data of the OIS device.

In a possible implementation, the first operation is any one of an operation of the user on a specific control, inputting a specific speech command, and performing a preset air gesture.

According to a third aspect, an apparatus is provided. The apparatus is included in an electronic device, and the apparatus has a function of implementing behavior of the electronic device in the foregoing aspects and any one of the methods in the possible implementations. The function may be implemented by using hardware, or may be implemented by hardware executing corresponding software. The hardware or the software includes at least one module or unit corresponding to the function, for example, a receiving module or unit, a display module or unit, and a processing module or unit.

According to a fourth aspect, a computer-readable storage medium is provided, including computer instructions, the computer instructions, when run on a terminal, causing the terminal to perform the method according to the foregoing aspects or any one of the possible implementations thereof.

According to a fifth aspect, a graphical user interface on an electronic device is provided. The electronic device has a display screen, a camera, a memory, and one or more processors, the one or more processors being configured to execute one or more computer programs stored in the memory, and the graphical user interface including a graphical user interface displayed when the electronic device performs the method according to the foregoing aspects and any one of the possible implementations thereof.

According to a sixth aspect, a computer program product is provided, the computer program product, when run on a computer, causing the computer to perform the method according to the foregoing aspects or any one of the possible implementations thereof.

According to a seventh aspect, a chip system is provided, including a processor, the processor, when executing instructions, performing the method according to the foregoing aspects or any one of the possible implementations thereof.

DETAILED DESCRIPTION OF ILLUSTRATIVE EMBODIMENTS

In description of the embodiments of this application, "/" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists. The terms "first" and "second" are used for descriptive purposes only and should not be construed as indicating or implying relative importance or implicitly indicating the number of technical features indicated. Therefore, features defining "first" and "second" may explicitly or implicitly include one or more such features. In the description of the embodiments of this application, unless otherwise stated, "a plurality of" means two or more. The word "exemplary" or "for example" is used to represent giving an example, an illustration, or a description. Any embodiment or design scheme described as an "exemplary" or "for example" in the embodiments of this application should not be explained as being more preferred or having more advantages than another embodiment or design scheme. Exactly, use of the word "exemplary" or "for example" or the like is intended to present a related concept in a specific manner.

For example, an image stabilization method provided in the embodiments of this application is applicable to an electronic device having a camera. The electronic device may be, for example, a mobile phone, a tablet computer, a personal computer (personal computer, PC), a personal digital assistant (personal digital assistant, PDA), a camera, a netbook, a wearable electronic device (such as a smart watch or a smart bracelet), an augmented reality (augmented reality, AR) device, a virtual reality (virtual reality, VR) device, or the like. A specific form of the electronic device is not specially limited in this application.

Figure 1:
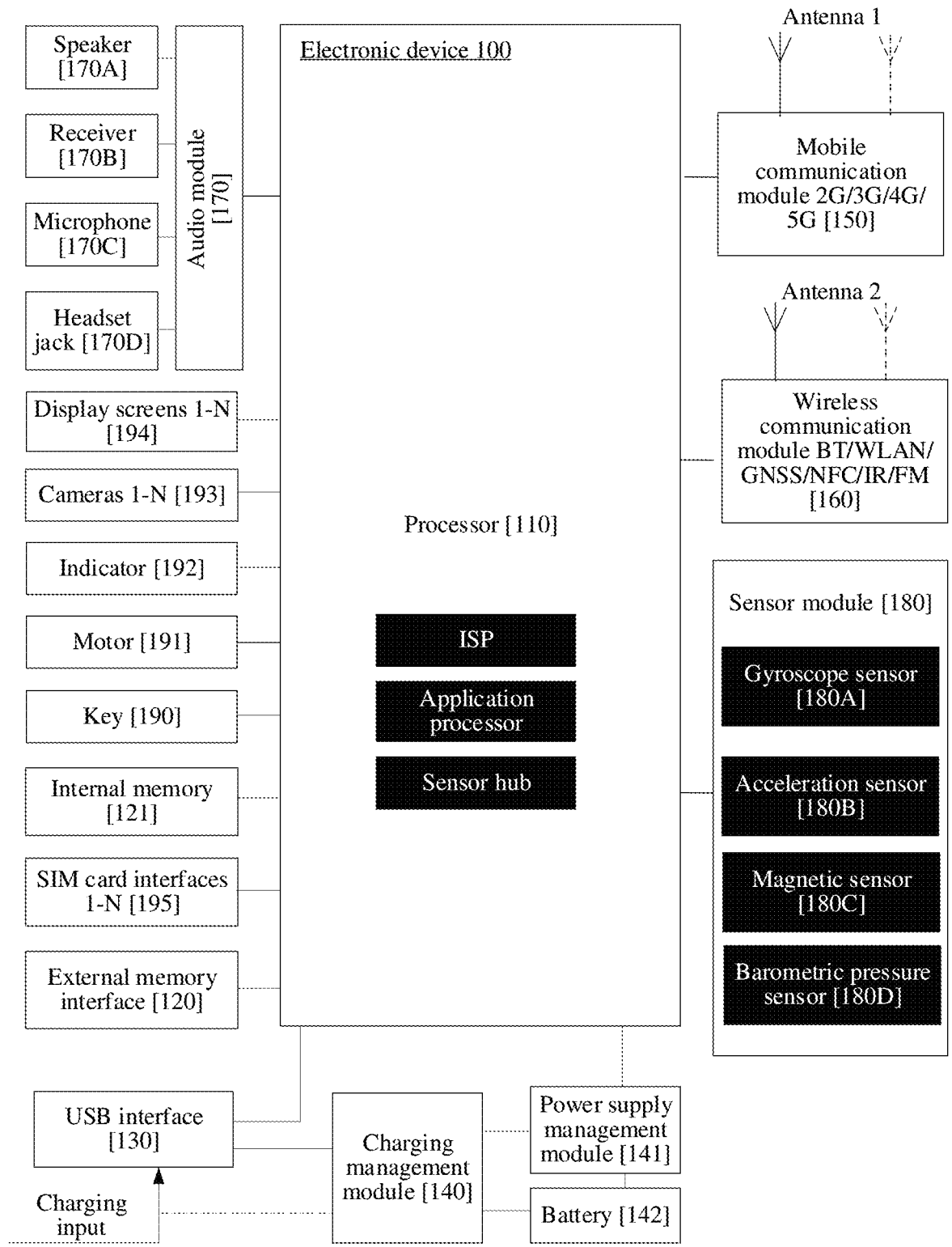
FIG. 1 is a schematic structural diagram of an electronic device according to an embodiment of this application.

FIG. 1 is a schematic structural diagram of an electronic device 100.

The electronic device 100 may include a processor no, an external memory interface 120, an internal memory 121, a universal serial bus (universal serial bus, USB) interface 13o, a charging management module 14o, a power management unit 141, a battery 142, an antenna 1, an antenna 2, a mobile communication module 15o, a wireless communication module 16o, an audio module 17o, a speaker 170A, a phone receiver 170B, a microphone 170C, a headset jack 170D, a sensor module 18o, a key 19o, a motor 191, an indicator 192, a camera 193, a display screen 194, a subscriber identity module (subscriber identity module, SIM) card interface 195, and the like. It may be understood that an example structure in this embodiment of the present invention does not constitute a specific limitation on the electronic device 100. In some other embodiments of this application, the electronic device 100 may include more or fewer components than those shown in the figure, or some components may be combined, or some components may be divided, or different component arrangements may be used. The components in the figure may be implemented by hardware, software, or a combination of software and hardware.

The processor no may include one or more processing units. For example, the processor no may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be independent devices, or may be integrated into one or more processors.

In some embodiments of this application, the processor no may further include a sensor hub, which can control a sensor in real time in a case that the AP is in a sleep state, so as to implement a function of reducing power consumption. For example, the sensor hub is configured to connect to a sensor that works at a low speed and for a long time such as a gyroscope or an accelerometer, to reduce the power consumption of the AP. In addition, the sensor hub may further fuse data of different types of sensors to implement a function that can only be implemented by combining various sensor data.

The controller may generate an operating control signal according to an instruction operation code and a sequence signal, to complete control of fetching and executing an instruction.

A memory may be further configured in the processor no, to store an instruction and data. In some embodiments, the memory in the processor no is a cache. The memory may store an instruction or data that has just been used or cyclically used by the processor no. If the processor no needs to use the instruction or the data again, the processor may directly invoke the instruction or the data from the memory, to avoid repeated access and reduce a waiting time of the processor no, thereby improving system efficiency.

In some embodiments, the processor no may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, and/or a universal serial bus (universal serial bus, USB) interface.

It may be understood that a schematic interface connection relationship among the modules in FIG. 1 is merely an example for description, and constitutes no limitation on the structure of the electronic device 100. In some other embodiments of this application, the electronic device 100 may alternatively use an interface connection manner different from that in the foregoing embodiment, or use a combination of a plurality of interface connection manners.

The charging management module 140 is configured to receive a charging input from a charger. The charger may be a wireless charger or a wired charger. In some embodiments of wired charging, the charging management module 140 may receive a charging input of a wired charger by using the USB interface 130. In some embodiments of wireless charging, the charging management module 140 may receive a wireless charging input by using a wireless charging coil of the electronic device boo. The charging management module 140 may supply power to the electronic device by using the power management module 141 while charging the battery 142.

The power management module 141 is configured to connect to the battery 142, the charging management module 14o, and the processor 110. The power management module 141 receives an input of the battery 142 and/or the charging management module 140, to supply power to the processor 110, the internal memory 121, the display screen 194, the camera 193, the wireless communication module 160, and the like. The power management module 141 may be further configured to monitor parameters such as a battery capacity, a battery cycle count, and a battery state of health (electric leakage and impedance). In some other embodiments, the power management module 141 may be alternatively disposed in the processor 110. In some other embodiments, the power management module 141 and the charging management module 140 may further be configured in the same device.

A wireless communication function of the electronic device 100 may be implemented by using the antenna 1, the antenna 2, the mobile communication module 150, the wireless communication module 160, the modem processor, the baseband processor, and the like.

The antenna 1 and the antenna 2 are configured to transmit or receive an electromagnetic wave signal. Each antenna in the electronic device 100 may be configured to cover one or more communication frequency bands. Different antennas may also be multiplexed to improve utilization of the antennas. For example, the antenna 1 may be multiplexed as a diversity antenna of a wireless local area network. In some other embodiments, the antenna may be used in combination with a tuning switch.

The mobile communication module 150 may provide a solution to wireless communication such as 2G/3G/4G/5G applied to the electronic device 100. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering and amplification on the received electromagnetic wave, and transmit a processed electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules of the mobile communication module 150 may be disposed in the processor no. In some embodiments, at least some functional modules of the mobile communication module 150 and at least some modules of the processor no may be disposed in the same device.

The modem processor may include a modulator and a demodulator. The modulator is configured to modulate a to-be-sent low-frequency baseband signal into a medium-high-frequency signal. The demodulator is configured to demodulate a received electromagnetic wave signal into a low-frequency baseband signal. Next, the demodulator transmits the demodulated low-frequency baseband signal to the baseband processor for processing. The low-frequency baseband signal is processed by the baseband processor and then transmitted to an AP. The AP outputs a sound signal through an audio device (which is not limited to the speaker 170A, the phone receiver 170B, and the like), or displays an image or a video through the display screen 194. In some embodiments, the modem processor may be an independent device. In some other embodiments, the modem processor may be independent of the processor no, and the modem processor and the mobile communication module 150 or another functional module may be disposed in the same component.

The wireless communication module 160 may provide a solution for wireless communication including a wireless local area network (wireless local area network, WLAN) (such as a wireless fidelity (wireless fidelity, Wi-Fi) network), Bluetooth (Bluetooth, BT), and a global navigation satellite system (global navigation satellite system, GNSS), frequency modulation (frequency modulation, FM), a near field communication (near field communication, NFC) technology, an infrared (infrared, IR) technology, and the like to be applied to the electronic device 100. The wireless communication module 160 may be one or more devices integrating at least one communication processing module. The wireless communication module 160 receives an electromagnetic wave by using the antenna 2, performs frequency modulation and filtering processing on an electromagnetic wave signal, and sends a processed signal to the processor no. The wireless communication module 160 may alternatively receive a to-be-sent signal from the processor no, perform frequency modulation and amplification on the to-be-sent signal, and convert the signal into an electromagnetic wave for radiation by using the antenna 2.

In some embodiments, in the electronic device 100, the antenna 1 is coupled to the mobile communication module iso, and the antenna 2 is coupled to the wireless communication module 160, so that the electronic device 100 may communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a beidou navigation satellite system (beidou navigation satellite system, BDS), a quasi-zenith satellite system (quasi-zenith satellite system, QZSS), and/or a satellite based augmentation system (satellite based augmentation systems, SBAS).

The electronic device 100 implements a display function by using the GPU, the display screen 194, the AP, and the like. The GPU is a microprocessor for image processing, and is connected to the display screen 194 and the AP. The GPU is configured to perform mathematical and geometric calculation, and is configured to render graphics. The processor no may include one or more GPUs, and execute program instructions to generate or change display information.

The display screen 194 is configured to display an image, a video, and the like. The display screen 194 includes a display panel. The display panel may be a liquid crystal display (liquid crystal display, LCD), an organic light-emitting diode (organic light-emitting diode, OLED), an active-matrix organic light-emitting diode (active-matrix organic light-emitting diode, AMOLED), a flex light-emitting diode (flex light-emitting diode, FLED), a mini LED, a micro LED, a micro-OLED, a quantum dot light emitting diode (quantum dot light emitting diode, QLED), or the like. In some embodiments, the electronic device wo may include one or N display screens 194, and N is a positive integer greater than 1.

The electronic device wo may implement a photographing function by using the ISP, the camera 193, the video codec, the GPU, the display screen 194, the AP, and the like.

The ISP is configured to process data fed back by the camera 193. For example, during photographing, a shutter is enabled. Light is transferred to a photosensitive element of the camera through a lens, and an optical signal is converted into an electrical signal. The photosensitive element of the camera transfers the electrical signal to the ISP for processing, and therefore, the electrical signal is converted into an image visible to a naked eye. The ISP may also perform algorithm optimization on image noise point, brightness, and skin tone. The ISP may alternatively optimize parameters such as exposure and a color temperature of a photographing scenario. In some embodiments, the ISP may be disposed in the camera 193.

The camera 193 is configured to capture a static image or a video. An optical image of an object is generated through a lens and is projected to the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into a standard image signal in RGB and YUV formats. In some embodiments, the electronic device 100 may include one or N cameras 193, and N is a positive integer greater than 1. In some other embodiments, at least one camera in the electronic device 100 is equipped with an optical image stabilization (optical image stabilization, OIS) device. The ISP or another processor may use data of the OIS device to perform image stabilization processing on an image or video acquired by a corresponding camera.

In the embodiments of this application, the electronic device 100 can implement a function of multi-view video recording. That is, the electronic device 100 can record videos of a plurality of different pictures simultaneously. For example, in dual-view recording, the electronic device 100 can record videos of two pictures simultaneously. For example, the electronic device 100 may respectively use a rear-facing camera to record a scenery on the back of the electronic device boo (that is, a scenery opposite to a user), and a front-facing camera to record a portrait or scenery in the front of the electronic device 100 (that is, a portrait or scenery on a user side). In another example, the electronic device 100 may use the same or different cameras to record pictures with different ratios, one is a panoramic picture with a smaller zoom ratio, and the other is a close-up picture with a larger zoom ratio.

If the electronic image stabilization technology in the related art is adopted, the electronic device 100 determines a motion feature of the electronic device boo (including a movement direction, a movement acceleration, a movement distance, or the like) according to the data of the OIS device and an image acquired by the camera 193, and compensates a plurality of acquired video pictures in the same unit or in different proportions according to the motion feature of the electronic device 100. Because different video pictures correspond to different photographing scenarios or different zoom ratios, different video pictures present different magnitudes of jitter for the same magnitude of movement of the electronic device 100. It can be seen that the electronic image stabilization technology in the related art cannot keep the plurality of video pictures stable simultaneously.

For example, the electronic device 100 simultaneously uses the rear-facing camera to capture a video picture 1 and uses the front-facing camera to capture a video picture 2. The scenery in the video picture 1 is generally far away from the electronic device 100, and a portrait (generally a photographer) in the video picture 2 is closer to the electronic device 100. Assuming that the electronic device 100 moves by 1 millimeter in a specific direction, correspondingly, the video picture 1 moves in this direction by a distance of one pixel, and the video picture 2 moves in an opposite direction by a distance of 0.2 pixels. If the same compensation is performed on the video picture 1 and the video picture 2, the stability of the video picture 2 cannot be ensured while the stability of the video picture 1 is ensured.

In another example, the electronic device 100 simultaneously uses the rear-facing camera to capture the video picture 1 and the video picture 2. A zoom ratio of the video picture 1 is "1×", and a zoom ratio of the video picture 2 is "5×". Assuming that the electronic device 100 moves by 1 millimeter in a specific direction, correspondingly, the video picture 1 moves in this direction by a distance of one pixel, and the video picture 2 moves in this direction by a distance of five pixels. If the same compensation is performed on the video picture 1 and the video picture 2, the stability of the video picture 2 cannot be ensured while the stability of the video picture 1 is ensured.

In view of this, the embodiments of this application provide an image stabilization method in which different image stabilization solutions are used for different video pictures acquired by the electronic device 100. For example, an image stabilization method of performing compensation according to the motion feature of the electronic device is used for a video picture in which a photographed scenery is far away from the electronic device or of which a zoom ratio is relatively small, and a solution of performing cropping by using a target object as a center is used for a video picture in which a photographed portrait is relatively close to the electronic device or of which a zoom ratio is relatively large, thereby ensuring the stability of the video pictures. In some other embodiments, for a video picture in which a photographed portrait is relatively close to the electronic device or of which a zoom ratio is relatively large, the solution of performing cropping by using a target object as a center is used, and compensation may be alternatively performed in combination with the motion feature of the electronic device 100. The image stabilization method is described in detail below.

The DSP is configured to process a digital signal, and may further process another digital signal in addition to a digital image signal. For example, when the electronic device 100 performs frequency selection, the DSP is configured to perform Fourier transform and the like on frequency energy.

The video codec is configured to compress or decompress a digital video. The electronic device 100 may support one or more video codecs. In this way, the electronic device 100 may play or record videos in a plurality of encoding formats, for example, moving picture experts group (moving picture experts group, MPEG) 1, MPEG 2, MPEG 3, and MPEG 4.

The NPU is a neural-network (neural-network, NN) computing processor, quickly processes input information by referring to a structure of a biological neural network, for example, a transmission mode between neurons in a human brain, and may further continuously perform self-learning. The NPU may be used to implement an application such as intelligent cognition of the electronic device 100, for example, image recognition, facial recognition, voice recognition, and text understanding.

The external memory interface 120 may be configured to connect to an external storage card, for example, a micro SD card, to expand a storage capability of the electronic device 100. The external storage card communicates with the processor no by using the external memory interface 120, to implement a data storage function, for example storing a file such as a music or a video in the external storage card.

The internal memory 121 may be configured to store computer executable program code, and the executable program code includes instructions. The internal memory 121 may include a program storage region and a data storage region. The program storage region may store an operating system, an application program required by at least one function (for example, a voice playing function or an image playing function), and the like. The data storage region may store data (for example, audio data and an address book) and the like created when the electronic device 100 is used. In addition, the internal memory 121 may include a high-speed random access memory, or may include a non-volatile memory such as at least one magnetic disk memory, a flash memory, or a universal flash storage (universal flash storage, UFS). The processor no runs the instructions stored in the internal memory 121 and/or the instructions stored in the memory disposed in the processor, to implement various functional applications and data processing of the electronic device 100.

The electronic device 100 may implement an audio function, for example, music playback or recording, by using the audio module 170, the speaker 170A, the phone receiver 170B, the microphone 170C, the headset jack 170D, the AP, and the like.

The audio module 170 is configured to convert digital audio information into an analog audio signal output, and is further configured to convert an analog audio input into a digital audio signal. The audio module 170 may be further configured to encode and decode an audio signal. In some embodiments, the audio module 170 may be disposed in the processor no, or some functional modules of the audio module 170 are disposed in the processor no. The speaker 170A, also referred to as a "horn", is configured to convert an audio electrical signal into a sound signal. Music can be listened to or a hands-free call can be answered by using the speaker 170A in the electronic device 100. The phone receiver 170B, also referred to as a "receiver", is configured to convert an audio electrical signal into a sound signal. When the electronic device 100 is configured to answer a call or receive voice information, the phone receiver 170B may be put close to a human ear to receive a voice. The microphone 170C, also referred to as a "mouthpiece" or a "megaphone", is configured to convert a sound signal into an electrical signal. When making a call or sending voice information, a user may make a sound near the microphone 170C through the mouth of the user, to input a sound signal into the microphone 170C. At least one microphone 170C may be disposed in the electronic device 100. In some other embodiments, two microphones 170C may be disposed in the electronic device 100, to collect a sound signal and implement a noise reduction function. In some other embodiments, three, four, or more microphones 170C may be alternatively disposed in the electronic device 100, to collect a sound signal, implement noise reduction, recognize a sound source, implement a directional recording function, and the like. The headset jack 170D is configured to connect to a wired headset. The headset jack 170D may be a USB interface 130, or may be a 3.5 mm open mobile terminal platform (open mobile terminal platform, OMTP) standard interface, or a cellular telecommunications industry association of the USA (cellular telecommunications industry association of the USA, CTIA) standard interface.

In some embodiments of this application, the electronic device 100 further includes an inertial measurement unit (inertial measurement unit, IMU) that can be configured to measure a three-axis attitude angle and an acceleration of the electronic device 100. Next, the ISP or another device may extract the motion feature of the electronic device 100 (for example, a movement direction, a movement speed, or a movement distance) by using data of the IMU. Further, image stabilization processing may be performed on a recorded video according to the extracted motion feature of the electronic device 100.

For example, the IMU includes a gyroscope sensor 180A and an acceleration sensor 180B.

The gyroscope sensor 180A may be configured to determine a motion posture of the electronic device 100. In some embodiments, an angular velocity of the electronic device 100 around three axes (i.e., x, y, and z axes) may be determined by using the gyroscope sensor 180A. The gyroscope sensor 180A may be used for image stabilization during photographing. For example, when the shutter is pressed, the gyroscope sensor 180A detects an angle at which the electronic device 100 jitters, and calculates, based on the angle, a distance for which a lens module needs to compensate, and allows the lens to cancel the jitter of the electronic device 100 through reverse motion, thereby implementing image stabilization. The gyroscope sensor 180A may also be used in navigation and a motion sensing game scenario.

The acceleration sensor 180B may detect acceleration values of the electronic device wo in all directions (generally in three axes). When the electronic device wo is stationary, a magnitude and a direction of gravity may be detected. The acceleration sensor may be further configured to recognize a posture of the electronic device, and is applied to an application such as switching between landscape orientation and portrait orientation or a pedometer.

Optionally, the electronic device wo may further include a magnetic sensor 180C, for example, a three-axis magnetometer specifically, which may be combined with a three-axis accelerometer to realize a function of a compass. The electronic device wo may determine the motion feature of the electronic device wo more accurately according to the magnetic sensor 180C. Optionally, the electronic device wo may further include a barometric pressure sensor 180D, a touch sensor, a compass, a GPS positioning module, and the like.

The key 190 includes a power key, a volume key, and the like. The key 190 may be a mechanical key, or a touch-type key. The electronic device wo may receive a key input, and generate a key signal input related to user setting and function control of the electronic device 100. The motor 191 may generate a vibration prompt. The motor 191 may be configured to provide a vibration prompt for an incoming call, and may be further configured to provide a touch vibration feedback. For example, touch operations performed on different applications (for example, photo taking and audio playing) may correspond to different vibration feedback effects. For touch operations performed on different regions of the display screen 194, the motor 191 may also correspond to different vibration feedback effects. Different application scenarios (for example, a time prompt, information receiving, an alarm clock, and a game) may also correspond to different vibration feedback effects. A touch vibration feedback effect may be further customized. The indicator 192 may be an indicator light, and may be configured to indicate a charging state or a battery change, or may be further configured to indicate a message, a missed call, a notification, or the like. The SIM card interface 195 is configured to connect to a SIM card. The SIM card may be inserted into the SIM card interface 195 or plugged from the SIM card interface 195, to come into contact with or be separated from the electronic device 100. The electronic device wo may support one or N SIM card interfaces. N is a positive integer greater than 1. The SIM card interface 195 can support a nano SIM card, a micro SIM card, a SIM card, and the like. A plurality of cards may all be inserted into the same SIM card interface 195. The plurality of cards may be of the same type or different types. The SIM card interface 195 may further be compatible with different types of SIM cards. The SIM card interface 195 may also be compatible with an external memory card. The electronic device wo interacts with a network by using a SIM card, to implement functions such as a call and data communication. In some embodiments, the electronic device wo uses an eSIM, that is, an embedded SIM card. The eSIM card may be embedded in the electronic device wo and cannot be separated from the electronic device 100.

The technical solutions provided in the embodiments of this application are described in detail with reference to the accompanying drawings by using an example in which the electronic device wo is a mobile phone and performs dual-view recording.

Figure 2:
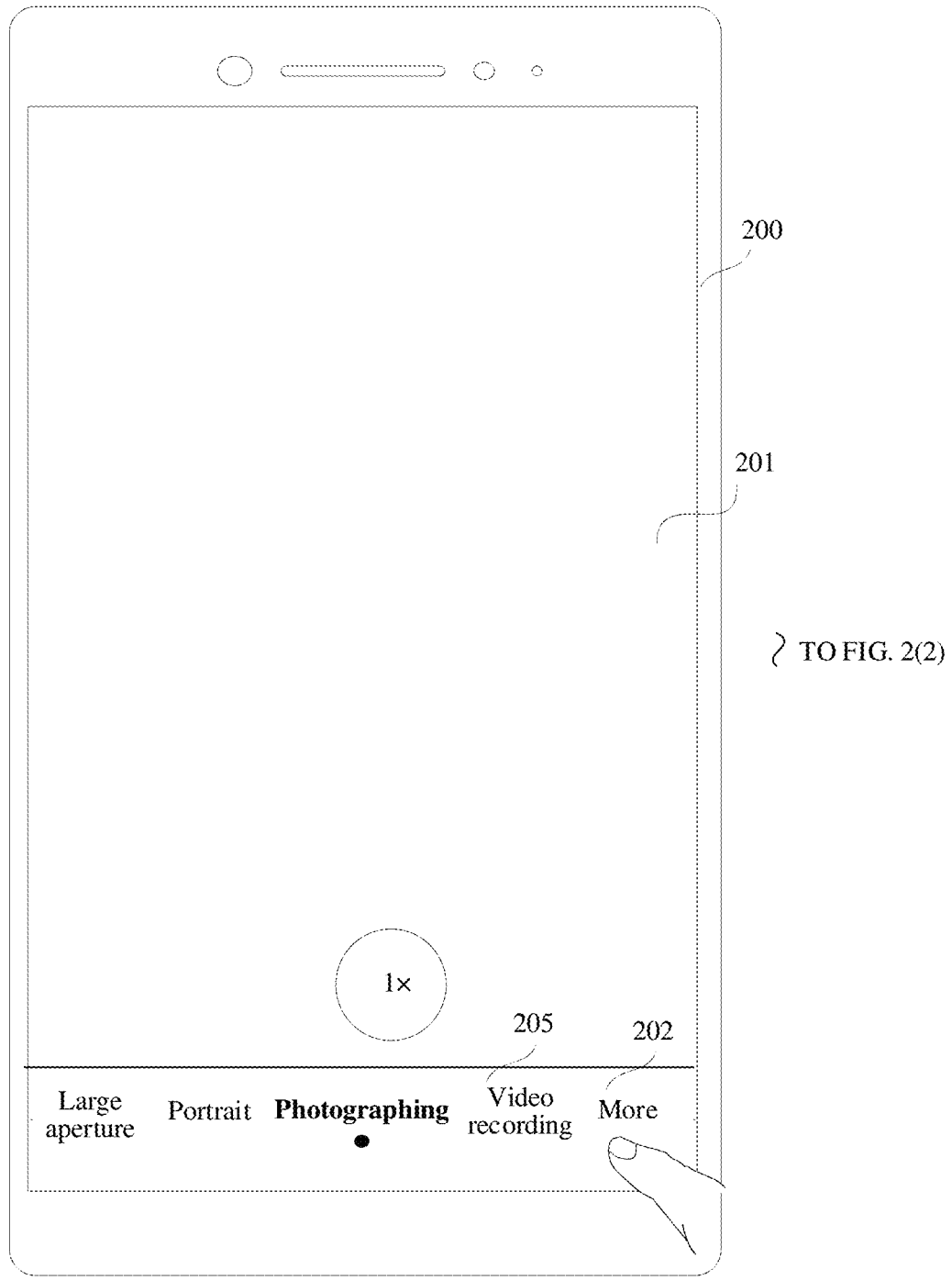
FIG. 2(1) to FIG. 2(3) are schematic diagrams of some user interfaces of an electronic device according to an embodiment of this application.
Figure 2:
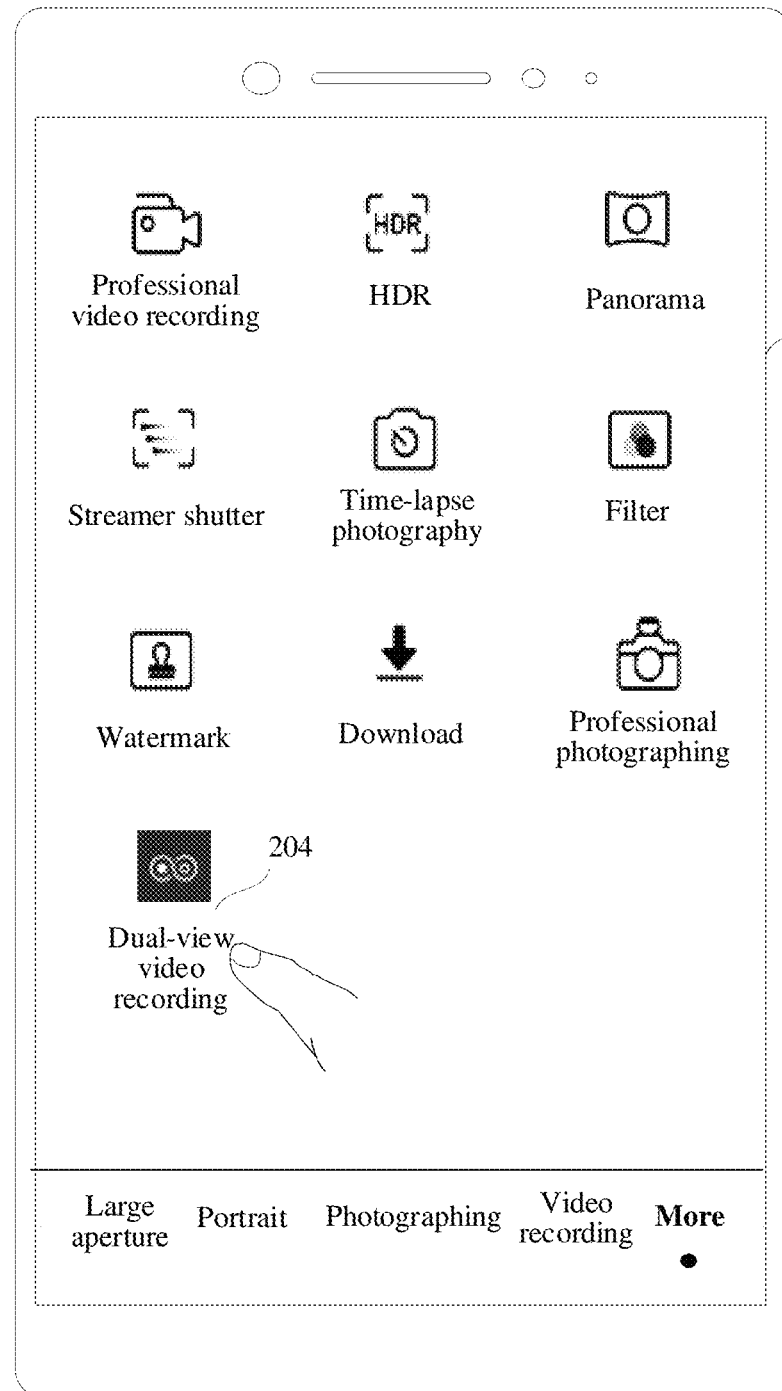
Figure 2:
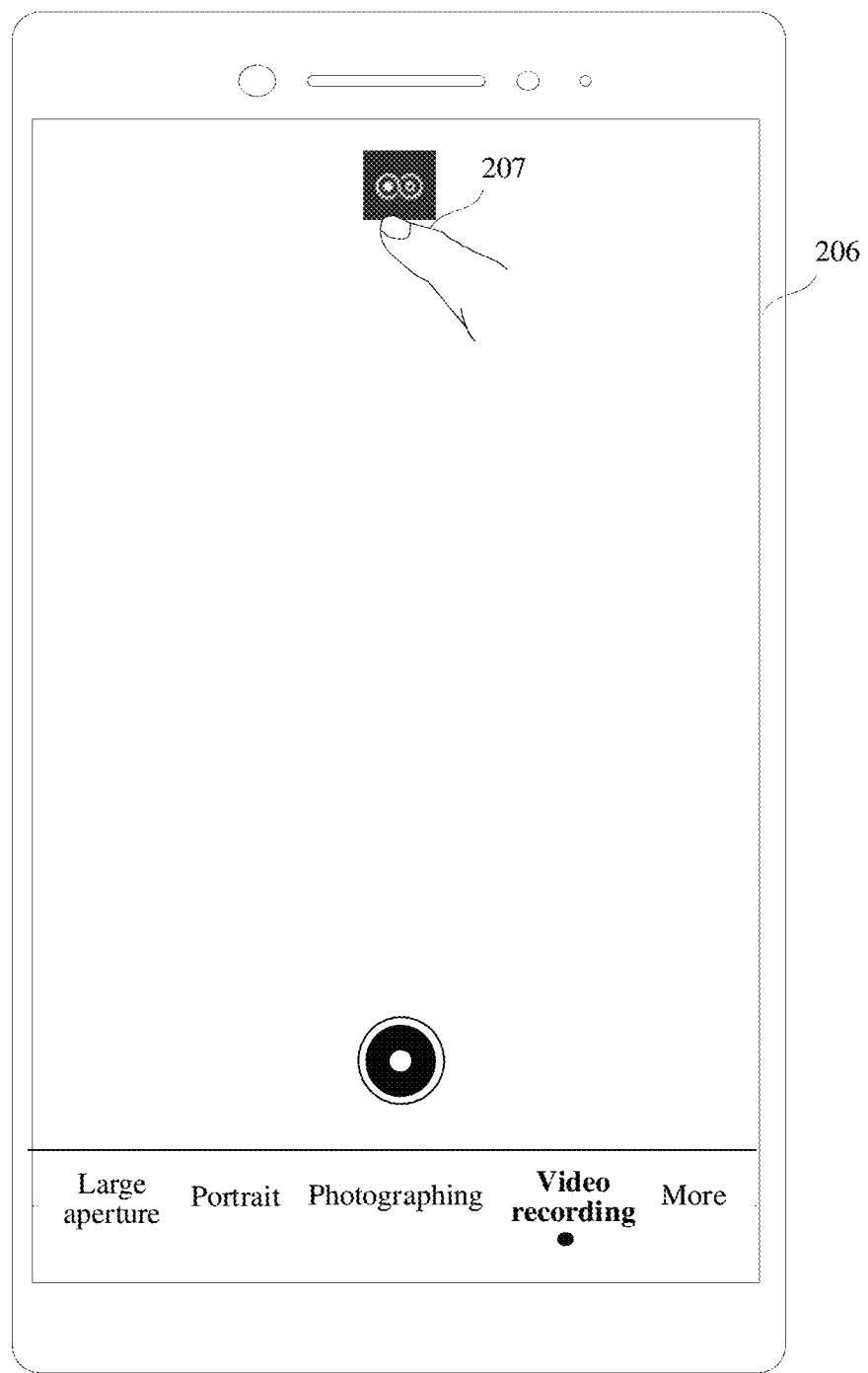

For example, a user starts a camera application. The camera application may be a native camera application of the mobile phone or a multi-functional camera application developed by a third party. In response to receiving an operation of starting a camera application by the user, the mobile phone may display a photographing interface 200 as shown in FIG. 2(1). The camera application may enable a "photograph" function by default. The photographing interface 200 includes a viewfinder frame 201 and function controls such as "large aperture", "portrait", "photograph", "video recording", and "more". In an example, the user may open, by operating a "more" control 202, a function option menu 203 as shown in FIG. 2(2). The function option menu 203 includes a "dual-view video recording" function control 204. The user may enable a dual-view video recording function by operating the "dual-view video recording" function control 204. In another example, the user may alternatively enter, by operating a "video recording" function control 205, a recording interface 206 of "video recording" as shown in FIG. 2(3). The recording interface 206 of "video recording" is provided with a "dual-view video recording" function control 207. Further, the user enables the dual-view video recording function by operating the "dual-view video recording" function control 207. In another example, when the mobile phone detects that the user starts a preset application or the mobile phone is in a preset recording scenario, the mobile phone may alternatively enable the dual-view recording function automatically. For example, when the user starts a live broadcast application, a video blog (video blog, Vlog) application, records a concert or sports event, or a quantity of times of switching between a front-facing camera or a rear-facing camera reaches a preset quantity of times, or a quantity of times of switching between a middle-focus camera or a telephoto camera reaches a preset quantity of times, the mobile phone automatically enables the dual-view video recording function or prompts the user to enable the dual-view video recording function. A specific manner of enabling the dual-view video recording function is not limited in the embodiments of this application.

Figure 3A:
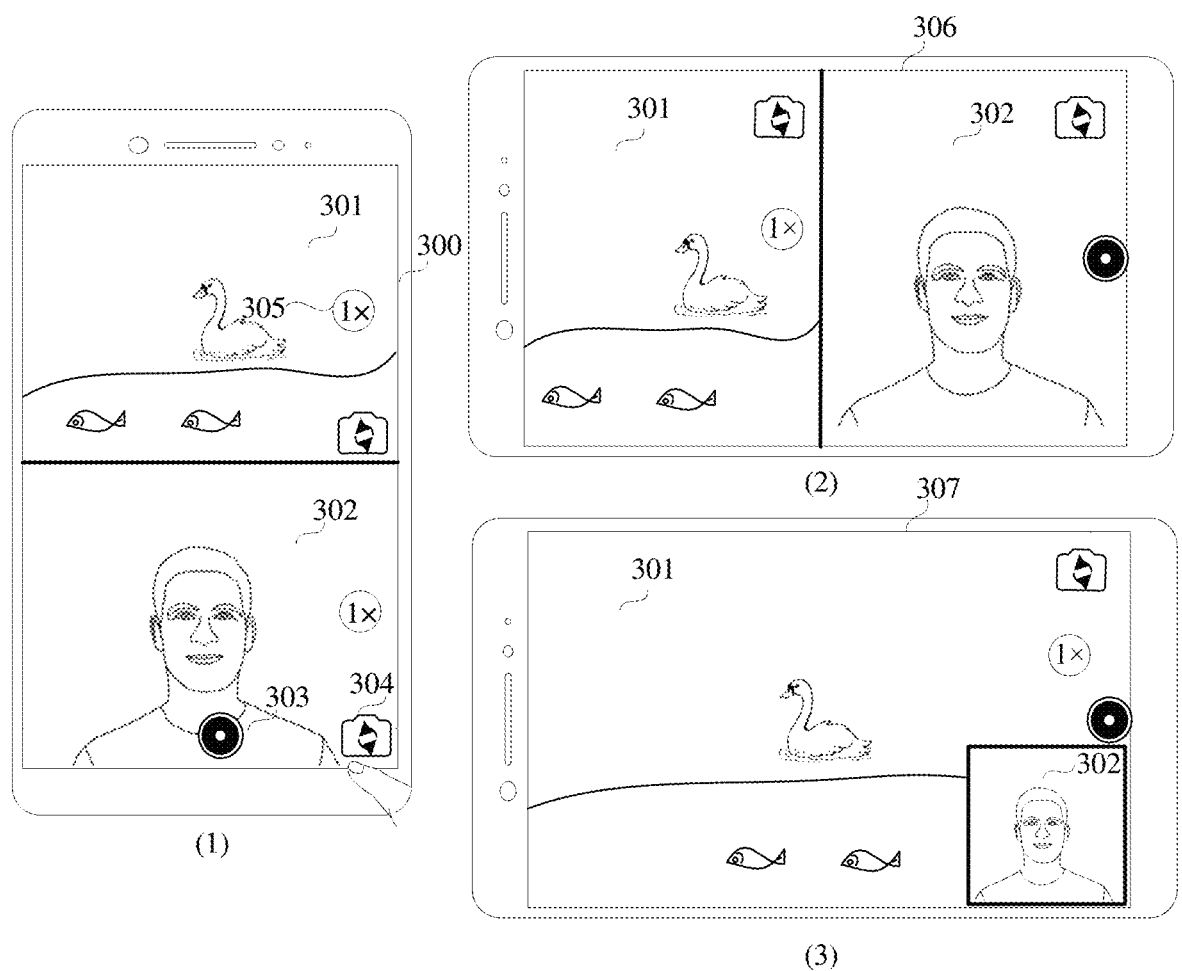
FIG. 3A is a schematic diagram of still other user interfaces of an electronic device according to an embodiment of this application.

After the dual-view video recording function is enabled, the mobile phone displays a dual-view recording interface 300 as shown in (i) in FIG. 3A. The dual-view recording interface 300 includes a viewfinder 301, a viewfinder 302, and a recording control 303. The viewfinder 301 is configured to display a picture acquired by the rear-facing camera, which is a scenery corresponding to the back of a screen of the mobile phone and is generally relatively far away from the rear-facing camera. The viewfinder 302 is configured to display a picture acquired by the front-facing camera, which is a relatively close photographer. On one hand, the mobile phone predicts the motion feature of the mobile phone according to the data of the IMU, and compensates a picture displayed in the viewfinder 301 according to the predicted motion feature of the mobile phone, to keep the stability of the picture in the viewfinder 301. Specifically, when no image stabilization solution is used, the mobile phone determines a size of a cropping region according to a zoom ratio, and performs cropping by using a center of an original image (that is, a full-size image or an image obtained after a full-size image is cropped in a small scale) acquired by the camera as a center of an image after cropping. Next, the mobile phone performs processing such as digital zoom on the image after cropping, to obtain a previewed or captured image. In other words, in this case, an image in a central region of the original image is cropped. After an image stabilization solution is used, and the mobile phone determines the size of the cropping region according to the zoom ratio, the mobile phone performs cropping by using a position to which the center of the original image offsets by a specific distance as a center. An offset direction is opposite to a predicted movement direction of the mobile phone, and an offset distance is positively correlated with a predicted movement distance of the mobile phone. On the other hand, the mobile phone crops, by using a face as a center, the original image acquired by the front-facing camera, to obtain a picture in the viewfinder 302 to ensure the stability of the picture in the viewfinder 302. Specifically, the mobile phone determines the size of the cropping region according to the zoom ratio, and performs cropping by using a center of a face image in the original image acquired by the camera as a center of an image after cropping. Next, the mobile phone performs processing such as digital zoom on the image after cropping, to obtain a previewed or captured image. Optionally, if an image acquired by the front-facing camera includes a plurality of faces, regions covered by the plurality of faces may be used as a whole. By using a center of the whole as a center of an image after cropping, cropping and processing such as digital zoom are performed on the image acquired by the front-facing camera to obtain the picture displayed in the viewfinder 302.

It can be seen that, the picture displayed in the viewfinder 302 is obtained by cropping the acquired original image using the face as a center, that is, the face is located in a center position of the picture in the viewfinder 302 and is relatively stable. Therefore, the user may focus on a scenery recorded in the viewfinder 301 and track and record a scenery desired to photograph (such as a white paddling swan), thereby improving the quality of a recorded picture and a comfort level of recording for the user. In addition, when the picture displayed in the viewfinder 301 is compensated according to the predicted motion feature of the mobile phone, there is no need to consider the stability of the picture in the viewfinder 302. Therefore, the picture in the viewfinder 301 may be compensated with higher accuracy, to improve the stability of the picture in the viewfinder 301. For example, an OIS device (such as a micro gimbal device) may be added to the rear-facing camera. In combination with the OIS device and the predicted motion feature of the mobile phone, the picture in the viewfinder 301 is compensated.

It should be noted that the mobile phone can start using different image stabilization solutions during the preview to process pictures displayed in different viewfinder frames, or may start using different image stabilization solutions during recording to process pictures displayed in different viewfinder frames, or may start using different image stabilization solutions to process pictures displayed in different viewfinder frames when recording is completed or when a video is saved. This is not limited in the embodiments of this application. A description is made herein by using an example in which the mobile phone starts using different image stabilization solutions during preview to process pictures displayed in different viewfinder frames.

Optionally, a size of the viewfinder 301 and a size of the viewfinder 302 may be the same or different. For example, when the mobile phone is in a portrait state, the mobile phone displays the dual-view recording interface 300 shown in (i) in FIG. 3A. A display screen is divided into an upper region and a lower region, and each region corresponds to a viewfinder. For example, when the mobile phone is in a landscape state, the mobile phone displays a dual-view recording interface 306 shown in (2) in FIG. 3A. The display screen is divided into a left region and a right region, and each region corresponds to a viewfinder. In another example, the mobile phone may further display a dual-view recording interface 307 shown in (3) in FIG. 3A. A viewfinder with a small size is covered on a viewfinder with a large size, and is located on an edge of the viewfinder with a large size. Optionally, the user may adjust the sizes of the viewfinder 301 and the viewfinder 302 and a relative position between the viewfinder 301 and the viewfinder 302. This is not limited in the embodiments of this application.

Figure 3B:
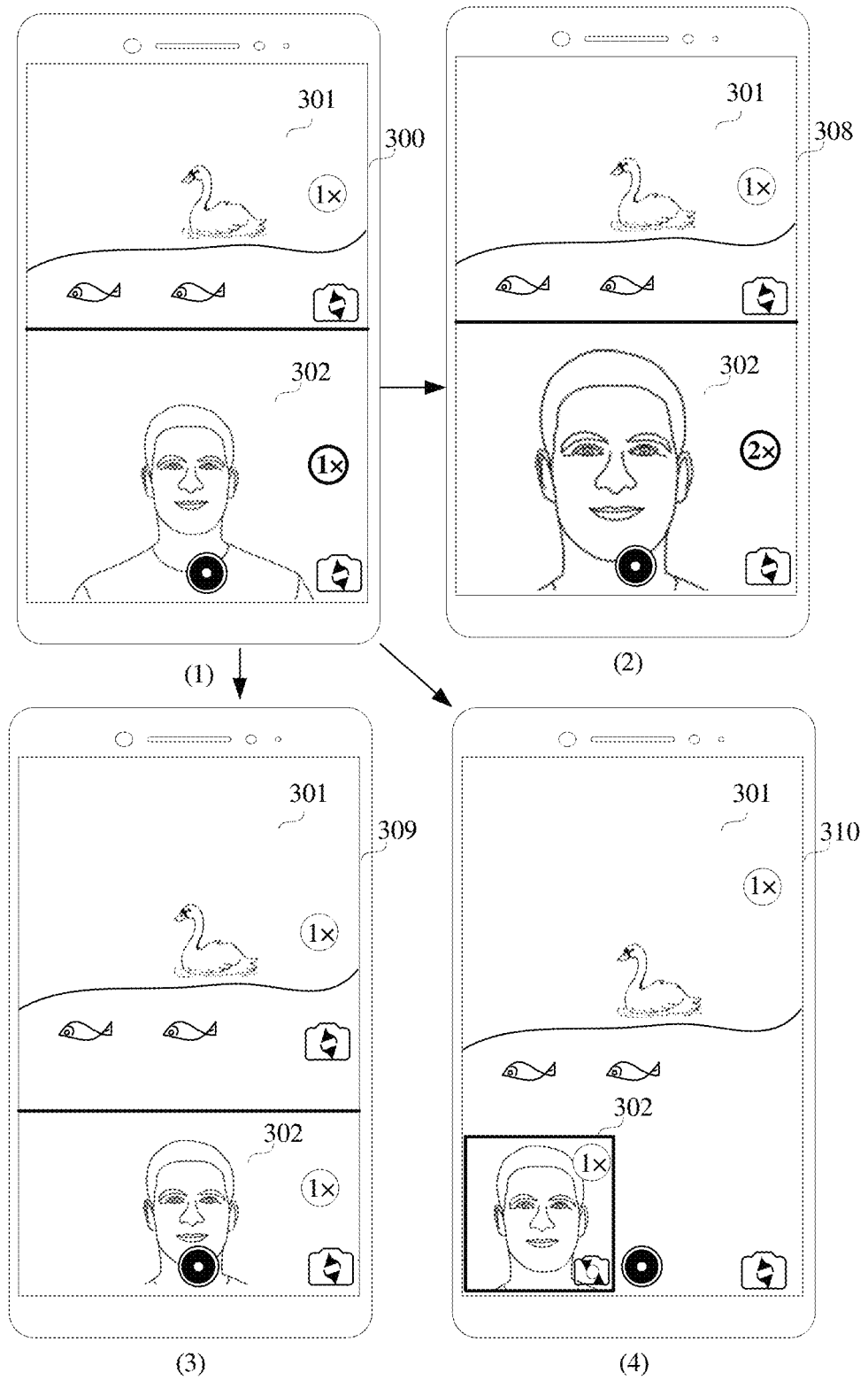
FIG. 3B is a schematic diagram of still other user interfaces of an electronic device according to an embodiment of this application.

In some embodiments, after the mobile phone crops, by using the face as a center, the image acquired by the front-facing camera, a zoom ratio of the viewfinder 302 may be further appropriately adjusted according to the size of the viewfinder 302. For example, as shown in (i) in FIG. 3B, the zoom ratio of the viewfinder 302 is a zoom ratio 1 (for example, "1×"). After the mobile phone crops the image acquired by the front-facing camera, the zoom ratio of the viewfinder 302 may be automatically increased to a zoom ratio 2 (for example, "2×"), as shown in a dual-view recording interface 308 in (2) in FIG. 3B. It can be seen that, a clearer facial expression of the user can be recorded by increasing the zoom ratio of the viewfinder 302.

In some other embodiments, after the mobile phone crops, by using the face as a center, the image acquired by the front-facing camera, the size of the viewfinder 302 may be further appropriately adjusted. For example, in a dual-view recording interface 309 shown in (3) in FIG. 3B, the size of the viewfinder 302 becomes smaller, and the size of the viewfinder 301 becomes larger. In another example, in a dual-view recording interface 310 shown in (4) in FIG. 3B, the size of the viewfinder 301 becomes larger, and the size of the viewfinder 302 becomes smaller and the viewfinder 302 moves to an edge of the viewfinder 301. It can be seen that increasing the size of the viewfinder 301 helps to record a clearer picture.

In still other embodiments, the user may manually adjust the zoom ratio of the viewfinder 301. For example, the user may increase the zoom ratio by sliding with two fingers to the outside of a screen, or reduce the zoom ratio by pinching with two fingers, or operate a specific control to change the zoom ratio. For example, the dual-view recording interface 300 further includes a zoom ratio indication control 305. The user may adjust the zoom ratio of the picture in the viewfinder 301 by operating the zoom ratio indication control 305. Correspondingly, the mobile phone may compensate, according to a changed zoom ratio, the predicted motion feature of the mobile phone, and the data of the OIS device, an original image acquired by the rear-facing camera, to obtain a picture after the zoom ratio is changed, and keep the picture stable. Generally, a larger zoom ratio of the picture indicates a greater compensation for the picture performed by the mobile phone according to the predicted motion feature of the mobile phone.

Optionally, when the mobile phone is equipped with a plurality of rear-facing cameras, the rear-facing cameras correspond to different focal lengths, and when the zoom ratios of the picture in the viewfinder 301 correspond to different focal lengths, the mobile phone may switch to different rear-facing cameras to acquire an image. For example, after the dual-view recording function is enabled on the mobile phone, the mobile phone acquires an image by using a middle-focus camera (that is, a main camera) first by default. An image captured by using the middle-focus camera may correspond to a zoom ratio in a range such as "1×" to "5×". When the user increases the zoom ratio of the viewfinder 301 to "5×" and above, the mobile phone switches to a telephoto camera to acquire an image. When the user reduces the zoom ratio of the viewfinder 301 to "1×" and below, the mobile phone switches to a short-focus (that is, wide-angle) camera to acquire an image.

In still other embodiments, the user may alternatively adjust the zoom ratio of the picture in the viewfinder 302. A specific adjustment manner is the same as an adjustment manner of the zoom ratio of the picture in the viewfinder 301. It should be noted that, after the zoom ratio of the viewfinder 302 is changed, the mobile phone still crops, by using the face as a center, the original image acquired by the front-facing camera, and performs processing such as digital zoom according to a changed zoom ratio, to obtain the picture in the viewfinder 302. Optionally, there may be alternatively two or more front-facing cameras. For related content, reference may be made to the description of the plurality of rear-facing cameras, and details are not described herein again.

In still other embodiments, the user may switch a camera used in the viewfinder 302, for example, switch from the front-facing camera to the rear-facing camera, or switch from the rear-facing camera to the front-facing camera. For example, the viewfinder 302 further includes a camera switching control 209. For example, in response to that the user operates a camera switching control 304 on a dual-view recording interface 300 shown in (1) in FIG. 4, the mobile phone displays a dual-view recording interface 400 shown in (2) in FIG. 4. In the dual-view recording interface 400, a picture displayed in the viewfinder 302 is a picture captured by the rear-facing camera. That is, in this case, pictures displayed in the viewfinder 301 and the viewfinder 302 are all images acquired by the rear-facing camera.

In an example, when the viewfinder 302 is just switched to the rear-facing camera, images may be acquired by using a specific rear-facing camera by default. For example, images are acquired by using a main camera by default, a telephoto camera, or a camera different from a camera used in the viewfinder 301. Subsequently, the user may adjust the zoom ratio of the viewfinder 302, and the mobile phone then switches to a corresponding rear-facing camera according to a changed zoom ratio and acquires an image.

In another example, when the viewfinder 302 is just switched to the rear-facing camera, images are acquired by using a specific rear-facing camera (for example, a telephoto camera) by default. That is, the picture in the viewfinder 302 is a close-up picture by default. The zoom ratio of the viewfinder 302 is a specific zoom ratio (for example, "5×" or above) by default.

In addition, the viewfinder 301 maintains a previous zoom ratio, and subsequently, the user may adjust the zoom ratio of the viewfinder 301. The viewfinder 301 is then switched to a corresponding rear-facing camera according to a changed zoom ratio and acquires an image. Alternatively, when the viewfinder 302 is just switched to the rear-facing camera, the viewfinder 301 is automatically switched to a specific rear-facing camera (for example, a middle-focus camera) to acquire an image. That is, the picture in the viewfinder 302 is a panoramic image. The zoom ratio of the viewfinder 302 is a specific zoom ratio (for example, "1×") by default. Optionally, after automatically switched to a specific rear-facing camera, the viewfinder 301 cannot be switched to another rear-facing camera.

Certainly, it may be considered by default that the picture in the viewfinder 302 is a panoramic picture and the picture in the viewfinder 301 is a close-up picture. This is not limited in the embodiments of this application. A description is made below by using an example in which the viewfinder 302 displays a close-up picture and the viewfinder 301 displays a panoramic picture.

For example, the picture displayed in the viewfinder 302 corresponds to a zoom ratio 3, and a camera A is used to acquire an image. The picture displayed in the viewfinder 301 corresponds to a zoom ratio 4, and a camera B is used to acquire an image. The camera A and the camera B are the same or different cameras, and the zoom ratio 3 is greater than the zoom ratio 4.

In this way, the mobile phone can automatically recognize a target object in a close-up according to an image acquired by the camera B, or receive a preset operation performed by the user and determine a target object in a close-up. The preset operation is, for example, a double tap, a long press, a frame selection, a voice input, or the like. Next, the mobile phone performs, by using the target object as a center, cropping and digital zoom on an image acquired by the camera A, to obtain the picture displayed in the viewfinder 302. If the mobile phone fails to recognize the target object in the close-up, or the user does not specify the target object in a close-up, the mobile phone continues to crop a central region of the image acquired by the camera A and perform digital zoom, to obtain the picture displayed in the viewfinder 302. As shown in (3) in FIG. 4, when a hand shake or a displacement of the target object causes a target object that the user intends to record is not located in the central region of the image acquired by the camera A, the target object is most likely to be displayed incompletely, which gives the user a strong shake feeling.

If the mobile phone automatically recognizes the target object in the close-up, or receives the target object selected by the user, the mobile phone may perform, by using the target object as a center, cropping and digital zoom on the image acquired by the camera A, to obtain the picture displayed in the viewfinder frame 302. In this way, even when the user shakes or the target object undergoes a relatively small displacement, the target object is still located in the center of the picture displayed in the viewfinder 302, thereby achieving picture stabilization.

Figure 4:
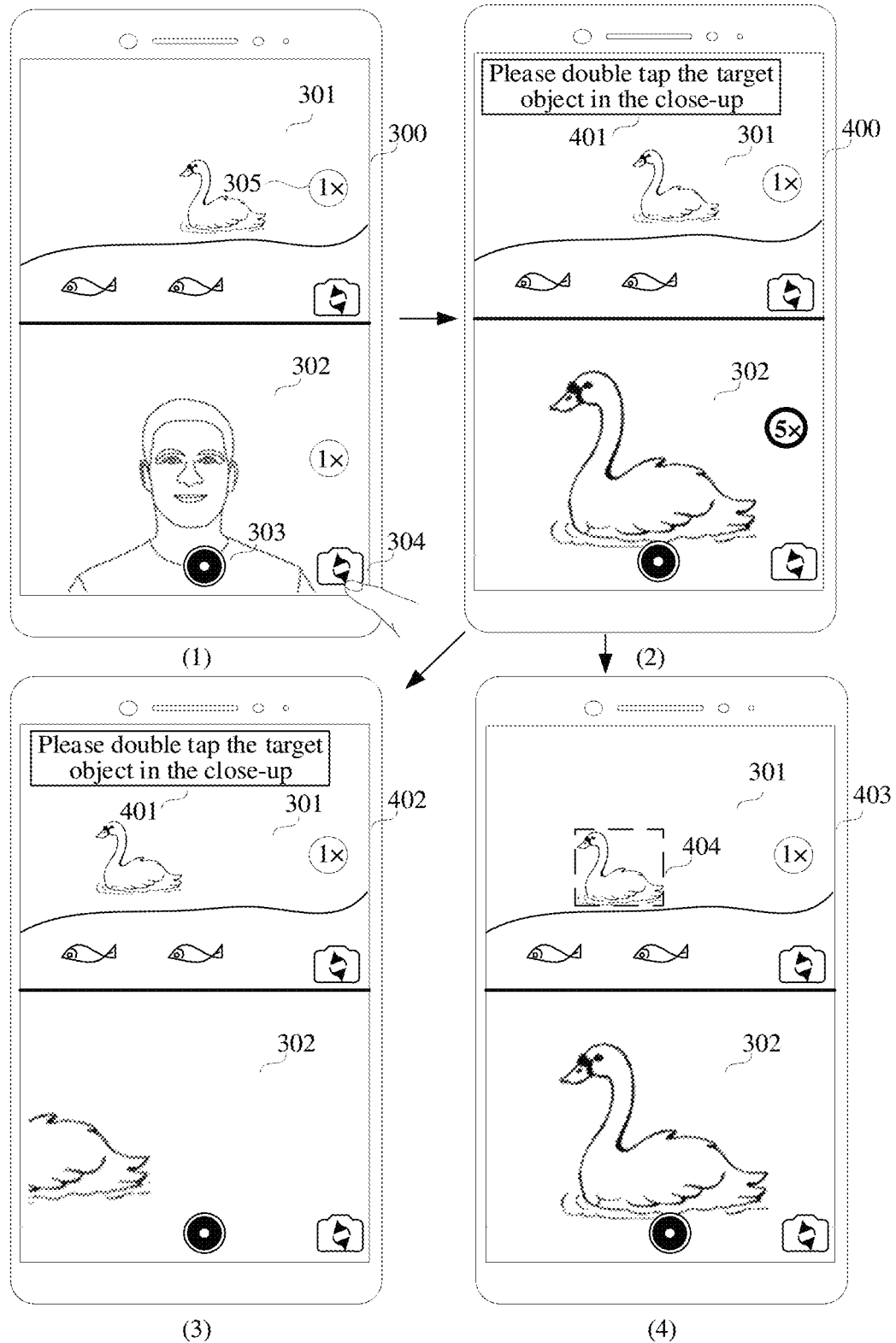
FIG. 4 is a schematic diagram of still other user interfaces of an electronic device according to an embodiment of this application.

For example, as shown in (2) in FIG. 4, the double-tap recording interface 400 may further include prompt information 401 to prompt the user to select the target object in the close-up. In response to that the user double taps the target object of a white swan, the mobile phone displays a recording interface 403 in (4) in FIG. 4. Optionally, the panoramic picture in the viewfinder 301 may display a marker box 404 to mark the target object selected by the user. Optionally, the user may cancel the selected target object or replace with a new target object by performing another preset operation. Certainly, the user may alternatively select a plurality of target objects. The mobile phone regards the selected plurality of target objects as a whole, and performs, by using the whole as a center of an image after cropping, cropping and digital zoom on the image acquired by the camera A, to obtain the picture displayed in the viewfinder 302.

A process in which the mobile phone processes, by respectively using different image stabilization solutions, the image acquired by the front-facing camera and the image acquired by the rear-facing camera is described in detail below.

Figure 5:
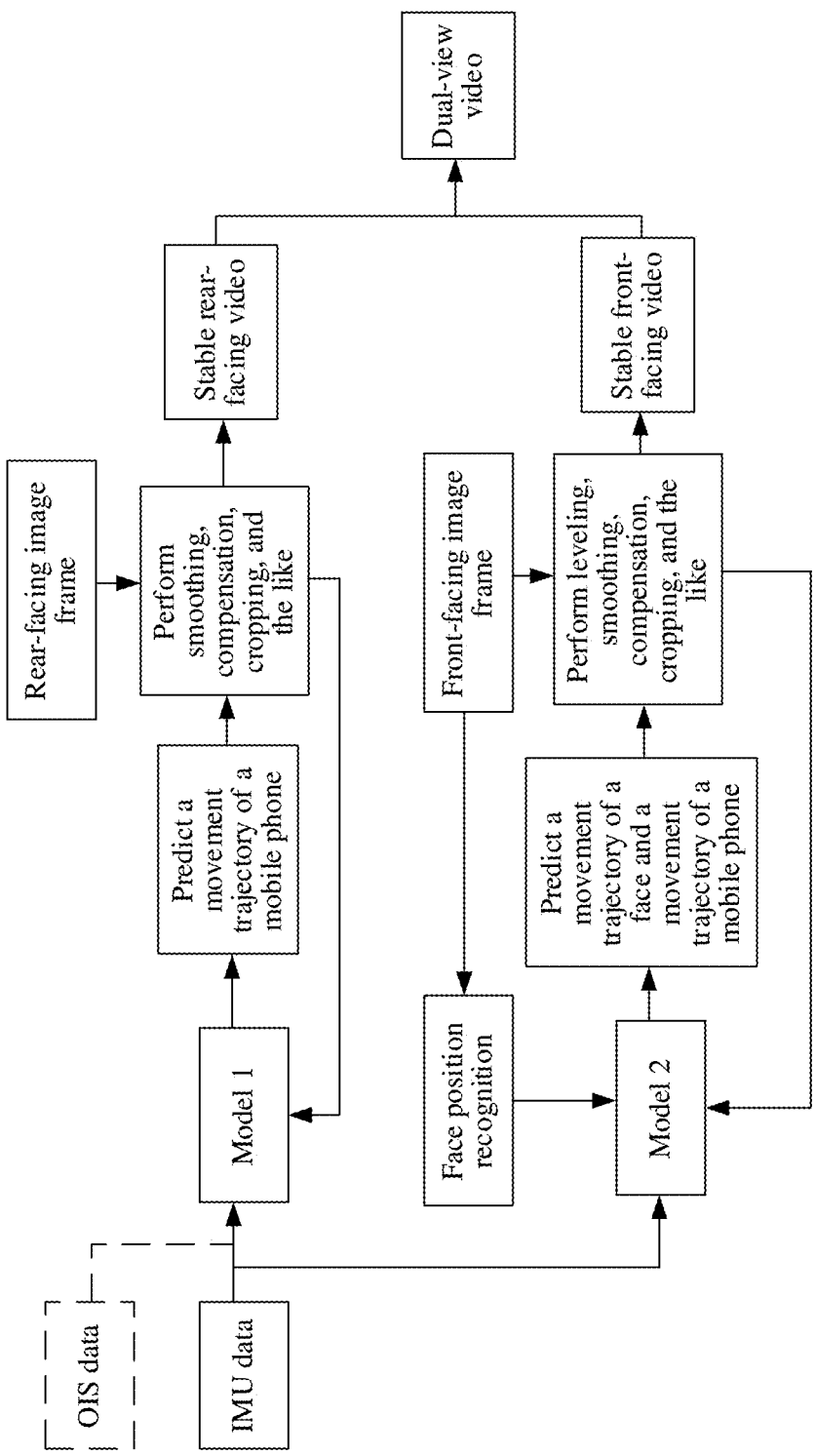
FIG. 5 is a schematic flowchart of an image stabilization method for recording a video according to an embodiment of this application.

FIG. 5 is a schematic flowchart of a dual-view recording method according to an embodiment of this application. A method for processing the image acquired by the rear-facing camera includes step 1 to step 3.

Step 1: The mobile phone obtains IMU data through an equipped IMU device. Optionally, if the rear-facing camera is equipped with an OIS device, OIS data is obtained.

The IMU device includes a three-axis accelerometer and a three-axis gyroscope. Optionally, the IMU device may further include a magnetometer, a barometer, a compass, and the like. The IMU data may be used for calculating a movement trajectory (including a movement direction and a movement distance) of the mobile phone and position and pose changes of the mobile phone.

In some examples, if the rear-facing camera of the mobile phone is further equipped with an OIS device, OIS data also needs to be obtained, so that a compensated part of the OIS device is considered when the movement trajectory of the mobile phone is calculated, and the accurate movement trajectory and the position and pose changes of the mobile phone are obtained.

Step 2: Input the IMU data and the OIS data into a pre-trained model 1 to predict a movement trajectory of the mobile phone.

The model 1 may be used for cleaning abnormal data in the IMU data and the OIS data, calculating a current movement trajectory and position and pose changes of the mobile phone, smoothing the movement trajectory and the position and pose changes, and predicting a movement trajectory and position and attitude changes of the mobile phone in a next time period according to a previous movement trajectory and position and pose changes of the mobile phone.

Step 3: Perform processing such as smoothing, compensation, and cropping on an image frame acquired by the rear-facing camera (referred to as a rear-facing image frame) according to the predicted movement trajectory of the mobile phone, to obtain a stable rear-facing video.

Due to a hand shake or a hand movement during a camera movement, a rolling exposure mechanism, and the like, there is jitter, deformation, and distortion in the image frame acquired by the rear-facing camera, which causes obvious jitter in an original image frame visually. In this embodiment of this application, the original image frame acquired by the rear-facing camera can be compensated in an opposite direction according to the previously predicted movement trajectory of the mobile phone.

Specifically, when no image stabilization solution is used, the mobile phone determines a size of a cropping region according to the zoom ratio, and performs cropping by using a center of the original image acquired by the camera as a center of an image after cropping. Next, the mobile phone performs processing such as digital zoom on the image after cropping, to obtain a previewed or captured image. In other words, in this case, an image of a full-scale central region is cropped. After an image stabilization solution is used, and the mobile phone determines the size of the cropping region according to the zoom ratio, the mobile phone performs cropping by using a position to which the center of the original image offsets by a specific distance as a center. An offset direction is opposite to a predicted movement direction of the mobile phone, and an offset distance is positively correlated with a predicted movement distance of the mobile phone. In addition, in a compensation process, the smooth transition of a plurality of consecutive image frames after cropping may be further considered, and a compensation distance may be adjusted appropriately. The mobile phone may further correct a deformed region, and perform image processing such as rotation on a distorted region.

Related parameters (such as a compensation direction, a compensation distance, and the like) involved in a compensation solution may be passed to the model 1, so that the model 1 can predict a subsequent movement trajectory more accurately.

A method for processing the image acquired by the front-facing camera includes step 1, and step 4 to step 6.

Step 4: The mobile phone performs face position recognition on an image frame (referred to as a front-facing image frame) obtained by the front-facing camera.

The image frame obtained by the front-facing camera may be inputted into a face position recognition model to recognize position information of a face. If the image frame obtained by the front-facing camera includes a plurality of faces, position information of the plurality of faces may be recognized.

Further, information such as a deflection angle and a face orientation of the face may be further recognized.

Step 5: The mobile phone inputs recognized face information (including face position information, a deflection angle, and an orientation) and the IMU data obtained from the IMU device into a pre-trained model 2, to predict a movement trajectory of a face and a movement trajectory of the mobile phone.

The model 2 may be used for cleaning abnormal data in the IMU data and the face position information, calculating the movement trajectory of the face, a current movement trajectory and position and pose changes of the mobile phone, smoothing the movement trajectory of the face, the movement trajectory and the position and pose changes of the mobile phone, and predicting a movement trajectory of the face, and a movement trajectory and position and pose changes of the mobile phone in a next time period according to a previous movement trajectory of the face, and a previous movement trajectory and position and pose changes of the mobile phone.

Step 6: Perform processing such as leveling, smoothing, compensating, and cropping on an image frame acquired by the front-facing camera (referred to as a front-facing image frame) according to the predicted movement trajectory of the face and movement trajectory of the mobile phone, to obtain a stable front-facing video.

In some embodiments, the mobile phone may crop, by using the face as a center, the front-facing image frame according to the predicted movement trajectory of the face, so as to achieve a picture stabilization effect. Certainly, the smooth transition of a plurality of consecutive image frames after cropping may be further considered during cropping, and processing such as fine adjustment may be performed at a cropping position. The mobile phone may further correct a deformed region, and perform image processing such as rotation on a distorted region.

In some other embodiments, the mobile phone may perform cropping on the front-facing image frame according to the predicted movement trajectory of the face and the predicted movement trajectory of the mobile phone. This is because the image acquired by the front-facing camera includes a face and a background. The face is relatively close to the mobile phone, and the background is generally relatively far away from the mobile phone. In some scenarios, a solution of cropping only by using the face as a center may cause poor background stability. Therefore, it is necessary to consider the stability of both the face and the background. In some examples, stability weights may be set for the face and the background. For example, in combination with a proportion of the face (or a human body) in the original image (or the image after cropping), weights of the stability of the face, the stability of the human body, and the stability of the background are matched. For example, when an area of the face in the original image reaches a preset ratio (for example, 60% or higher), the weight of the stability of the face is higher. That is, cropping is performed mainly centered on the face, and the stability of the background is not considered or less considered. When the area of the face in the original image does not reach the preset ratio, the weight of the stability of the background is higher. That is, cropping is performed after a cropping center is moved in an opposite direction of a movement direction of the mobile phone by a corresponding distance, and the stability of the face is not considered or less considered. In some other examples, a face (or a human body) in each image frame may be alternatively separated from a background, and different image stabilization solutions are used for processing the face (or the human body) and the background, and two processed images are then synthesized to obtain a front-facing video with a stable face and a stable background.

Optionally, considering that the user may not be able to accurately ensure a horizontal placement of the mobile phone during recording, that is, in the image acquired by the front-facing camera, the background (such as a building) may tilt. In this case, the mobile phone may further rotate the background, so that the background in the front-facing video is in a horizontal position.

Related parameters (such as a compensation direction, a compensation distance, and the like) involved in a compensation solution may be passed to the model 2, so that the model 2 can predict a subsequent movement trajectory of the face and movement trajectory of the mobile phone more accurately.

After step 3 and step 6, the mobile phone performs stitching or superimposition according to a ratio of the front-facing video to the rear-facing video in the display screen, to obtain a dual-view video finally displayed in the display screen.

For example, if the ratio of the front-facing video to the rear-facing video in the display screen is 1:1, the mobile phone may adjust the processed front-facing video and rear-facing video to formats of the same size and stitch the processed front-facing video and rear-facing video together to obtain a dual-view video (or a preview image), such as the dual-view recording interface 300 shown in (i) in FIG. 3A or the dual-view recording interface 306 shown in (2) in FIG. 3A.

In another example, if the ratio of the front-facing video to the rear-facing video in the display screen is 1:8, and the front-facing video is superimposed on the rear-facing video, the mobile phone may adjust format sizes of the processed front-facing video and rear-facing video to a ratio of 1:8, and superimpose the front-facing video on the rear-facing video to obtain a dual-view video (or a preview image), such as the dual-view recording interface 307 shown in (3) in FIG. 3A.

Figure 6:
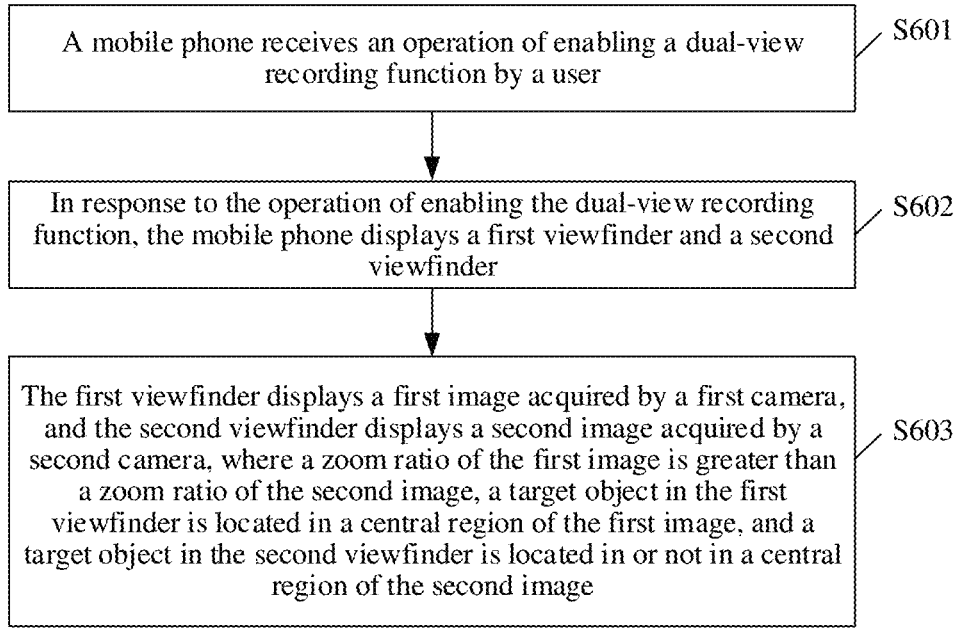
FIG. 6 is a schematic flowchart of another image stabilization method for recording a video according to an embodiment of this application.

FIG. 6 is a schematic flowchart of a video image stabilization method according to an embodiment of this application. The process specifically includes the following steps:

S601: A mobile phone receives an operation of enabling a dual-view recording function by a user.

The operation of enabling the dual-view recording function by the user, for example, is an operation of tapping a switch of the dual-view recording function in a camera application by the user, or performing a predefined operation, or inputting a speech command.

S602: In response to the operation of enabling the dual-view recording function, the mobile phone displays a first viewfinder and a second viewfinder.

S603: The first viewfinder displays a first image acquired by a first camera, and the second viewfinder displays a second image acquired by a second camera. A zoom ratio of the first image is greater than a zoom ratio of the second image. A target object in the first viewfinder is located in a central region of the first image, and a target object in the second viewfinder is located in or not in a central region of the second image.

The first camera is a telephoto camera, and the second camera is a middle-focus camera or a short-focus camera; or the first camera and the second camera are the same camera, but the zoom ratio of the first image is greater than the zoom ratio of the second image. It should be noted that, in this embodiment, the first camera and the second camera are cameras on the same side of the mobile phone.

Generally, the user aims at the target object for photographing, and in this example, the first camera and the second camera are cameras on the same side of the mobile phone. Therefore, the first viewfinder and the second viewfinder both include the target object. The target object may be automatically recognized by the mobile phone according to an acquired original image, or may be determined by the mobile phone according to a selection operation of the user. The target object may include one or more objects. For example, the target object includes one or more faces (or human bodies).

Specifically, the mobile phone crops, by using a target object in a first original image acquired by the first camera as a center, the first original image to obtain the first image. For a second original image acquired by the second camera, a manner of performing compensation according to a motion feature of the mobile phone is used for stabilizing a picture. That is, cropping is performed by using a position to which a center of the second original image is moved in a first direction by a first distance as a center, to obtain the second image. The first direction and the first distance are determined according to the motion feature of the electronic device.

It can be understood that, an image displayed by the second viewfinder is obtained by compensating an acquired original image according to the motion feature of the mobile phone. In some cases, the target object in the second viewfinder may be not located in a central region of the image. For example, the target object is not located in the central region of the second viewfinder, that is, the target object does not deviate from the central region of the second viewfinder due to a shake of the mobile phone. For example, the target object originally located in the central region of the image moves out of the central region of the second viewfinder. In this case, even if compensation is performed according to the motion feature of the mobile phone, the target object in the second viewfinder is still not located in the central region of the second image. However, because the first image in the first viewfinder is cropped by using the target object as a center, the target object is always located in the central region of the first image, as shown in the interface 403 in (4) in FIG. 4. The viewfinder 301 is the second viewfinder, and the viewfinder 302 is the first viewfinder.

It should be noted that, the target object being located in the central region of the image (the first image or the second image) includes that a distance between a center of the target object and a center of the image is less than or equal to a preset threshold (for example, a distance of two pixels). The center of the target object is, for example, a geometric center of a rectangular box occupied by the target object in the image.

Figure 7:
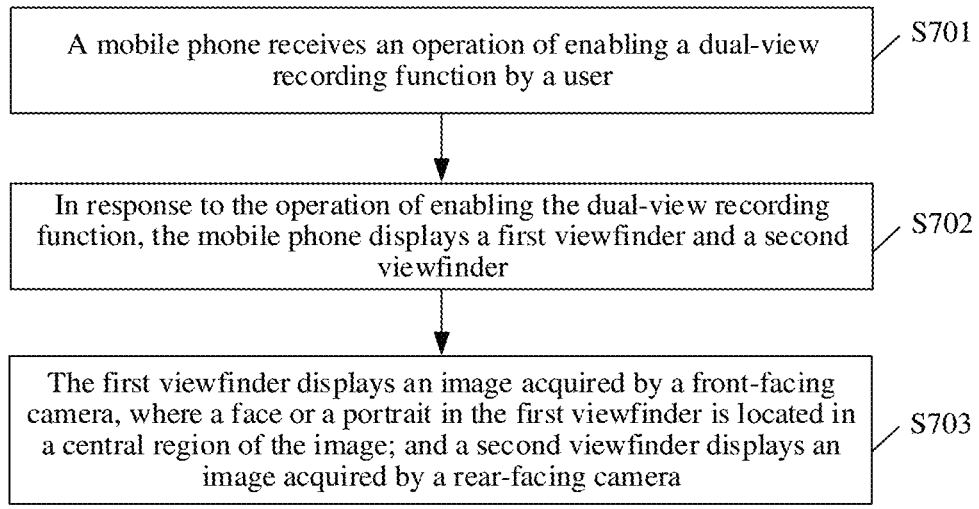
FIG. 7 is a schematic flowchart of another image stabilization method for recording a video according to an embodiment of this application.

FIG. 7 is a schematic flowchart of another video image stabilization method according to an embodiment of this application. The process specifically includes the following steps:

S701: A mobile phone receives an operation of enabling a dual-view recording function by a user.

The operation of enabling the dual-view recording function by the user, for example, is an operation of tapping a switch of the dual-view recording function in a camera application by the user, or performing a predefined operation, or inputting a speech command.

S702: In response to the operation of enabling the dual-view recording function, the mobile phone displays a first viewfinder and a second viewfinder.

S703: The first viewfinder displays an image acquired by a front-facing camera, a face or a portrait in the first viewfinder is located in a central region of the image, and the second viewfinder displays an image acquired by a rear-facing camera.

For example, the face being located in the central region of the image includes that a distance between a center of the face or the portrait and a center of the image is less than or equal to a preset threshold (for example, a distance of two pixels). The center of the face or the portrait is, for example, a geometric center of a rectangular box occupied by the face or the portrait in the image.

Similarly, an original image acquired by the front-facing camera is cropped by using a face or a portrait as a center, to obtain an image displayed by the first viewfinder, and the face or the portrait is always kept in a central region of the first viewfinder to stabilize the face or the portrait. Picture compensation is performed, in combination with a motion feature of the mobile phone, on an original picture acquired by the rear-facing camera, to achieve a picture stabilization effect.

A picture stabilization effect achieved by the method provided in this embodiment of this application is described below with reference to FIG. 8.

Figure 8:
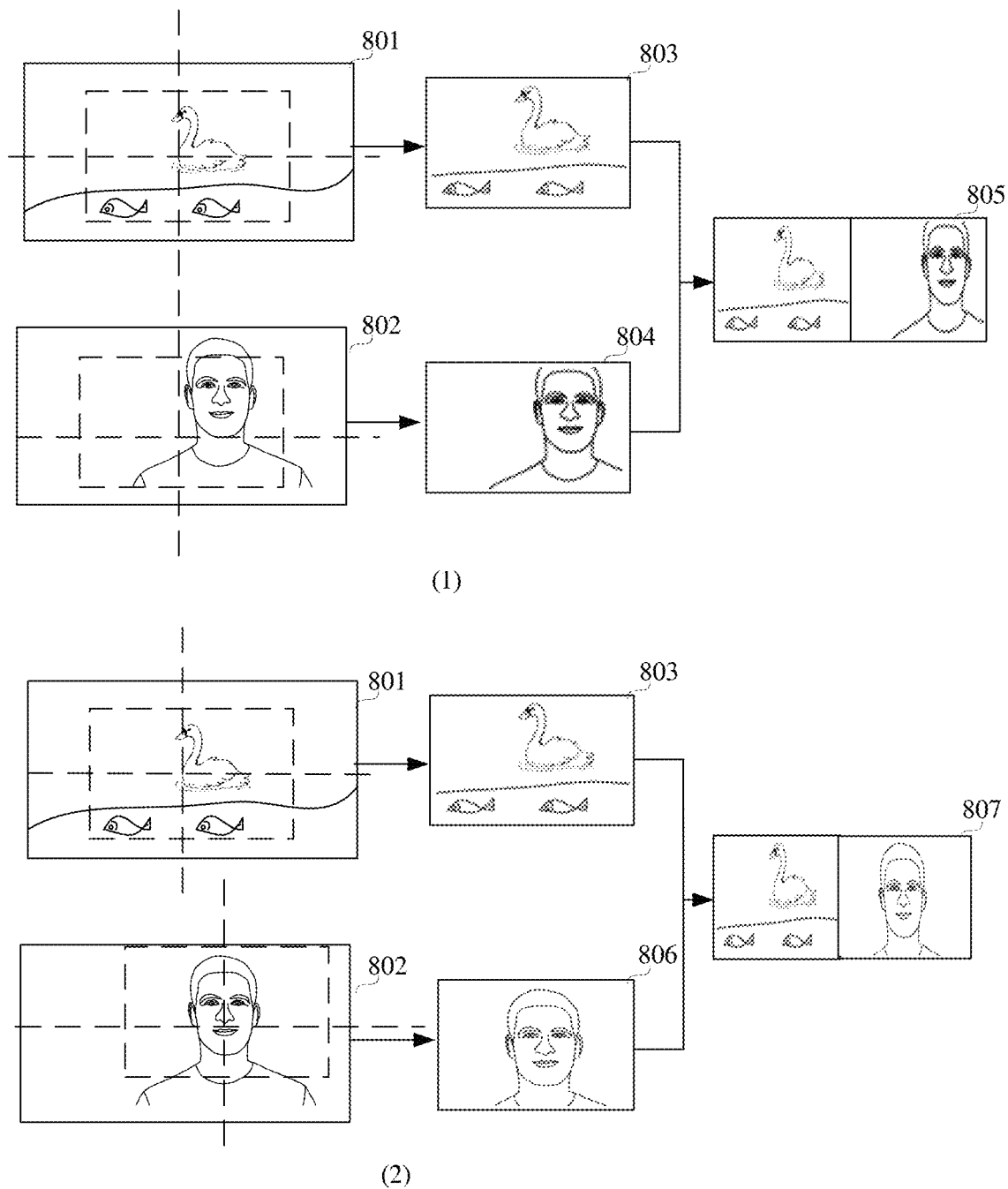
FIG. 8 is a schematic flowchart of another image stabilization method for recording a video according to an embodiment of this application.

In the related art, as shown in (1) in FIG. 8, an image 801 is an original image acquired by the rear-facing camera. If compensation is performed according to the motion feature of the mobile phone. That is, a center of the image 801 is used as a center and moved in a first direction by a first distance, and an image of a corresponding size, that is, an image 803 is then cropped. An image 802 is an original image acquired by the front-facing camera. Compensation is performed according to the motion feature of the mobile phone. That is, a center of the image 802 is used as a center and moved in the first direction by the first distance, and an image of a corresponding size, that is, an image 804 is then cropped. Next, the image 803 and the image 804 are combined to obtain an image 805. Other image processing such as proportional reduction may be further performed on the image 803 and the image 804 during combination. This is not limited herein.

In this application, as shown in (2) in FIG. 8, the image 801 is an original image acquired by the rear-facing camera. If compensation is performed according to the motion feature of the mobile phone, an image 803 is obtained. An image 802 is an original image acquired by the front-facing camera. If cropping is correspondingly performed by using a face in the image 802 as a center, an image 806 is obtained. Next, the image 803 and the image 806 are combined to obtain an image 807. Other image processing such as proportional reduction may be further performed on the image 803 and the image 804 during combination. This is not limited herein.

As can be known from a comparison between the image 805 and the image 807, the face in the picture captured by the front-facing camera can be always kept in the center of the image by using the method described in (2) in FIG. 8, so as to achieve face stabilization.

Figure 9:
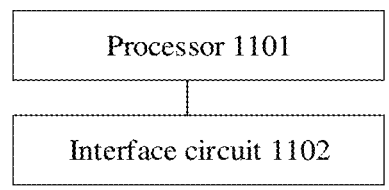
FIG. 9 is a schematic structural diagram of a chip system according to an embodiment of this application.

An embodiment of this application further provides a chip system. As shown in FIG. 9, the chip system includes at least one processor 1101 and at least one interface circuit 1102. The processor 1101 and the interface circuit 1102 may be interconnected by lines. For example, the interface circuit 1102 may be configured to receive a signal from another apparatus (such as a memory of the electronic device 100). In another example, the interface circuit 1102 may be configured to send a signal to another apparatus (for example, the processor 1101). For example, the interface circuit 1102 may read instructions stored in the memory and send the instructions to the processor 100. The instructions, when executed by the processor 1101, may cause the electronic device to perform the steps performed by the electronic device 100 (for example, a mobile phone) in the foregoing embodiments. Certainly, the chip system may further include other discrete devices. This is not specifically limited in this embodiment of this application.

An embodiment of this application further provides an apparatus. The apparatus is included in the electronic device, and the apparatus has a function of implementing behavior of the electronic device in any one of the methods in the foregoing embodiments. The function may be implemented by using hardware, or may be implemented by hardware executing corresponding software. The hardware or the software includes at least one module or unit corresponding to the function, for example, a detection module or unit, a display module or unit, a determining module or unit, and a calculation module or unit.

An embodiment of this application further provides a computer storage medium, including computer instructions, the computer instructions, when run on an electronic device, causing the electronic device to perform any one of the methods in the foregoing embodiments.

An embodiment of this application further provides a computer program product, the computer program product, when run on a computer, causing the computer to perform any one of the methods in the foregoing embodiments.

An embodiment of this application further provides a graphical user interface on an electronic device. The electronic device has a display screen, a camera, a memory, and one or more processors, the one or more processors being configured to execute one or more computer programs stored in the memory, and the graphical user interface including a graphical user interface displayed when the electronic device performs any one of the methods in the foregoing embodiments.

It may be understood that, to implement the foregoing functions, the foregoing terminal includes a corresponding hardware structure and/or software modules for performing the functions. A person skilled in the art should be easily aware that, in combination with the units and algorithm steps of the examples described in the embodiments disclosed in this specification, the embodiments of this application can be implemented by hardware or a combination of hardware and computer software. Whether a function is implemented by hardware or computer software driving hardware depends on particular applications and design constraints of the technical solutions. A person skilled in the art may use different methods to implement the described functions for each particular application, but it should not be considered that the implementation goes beyond the scope of the embodiments of the present invention.

In this embodiment of this application, functional modules of the terminal may be divided according to the foregoing method examples. For example, the functional modules may be divided corresponding to various functions, or two or more functions may be integrated into one processing module. The integrated module may be implemented in the form of hardware, or may be implemented in the form of a software functional module. It should be noted that, in this embodiment of the present invention, the division of the modules is merely an example, and is merely division of logical functions. During actual implementation, there may be another division manner.

Through the descriptions of the foregoing implementations, a person skilled in the art may clearly understand that, for the purpose of convenient and brief description, only division of the foregoing functional modules is used as an example for description. In actual application, the foregoing functions may be allocated to and completed by different functional modules according to requirements. That is, an internal structure of an apparatus is divided into different functional modules to complete all or some of the functions described above. For specific work processes of the system, the apparatus and the unit described above, reference may be made to the corresponding processes in the foregoing method embodiments. Details are not described herein again.

In this embodiment of this application, functional units in the embodiments may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the embodiments of this application essentially, or the part contributing to the related art, or all or some of the technical solutions may be implemented in the form of a software product. The computer software product is stored in a storage medium and includes several instructions for instructing a computer device (which may be a personal computer, a server, a network device, or the like) or a processor to perform all or some of the steps of the methods described in the embodiments of this application. The foregoing storage medium includes: any medium that can store program code, such as a flash memory, a removable hard disk, a read-only memory, a random access memory, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A video image stabilization processing method, applicable to an electronic device comprising a first camera and a second camera, and the method comprising:

receiving a first operation;
displaying a first viewfinder and a second viewfinder in response to receiving the first operation, wherein the first viewfinder is configured to display a first image acquired by the first camera, and the second viewfinder is configured to display a second image acquired by the second camera;
cropping, by using a target object in a first original image acquired by the first camera as a center, the first original image to obtain the first image; and
cropping, by using a position to which a center of a second original image acquired by the second camera is moved in a first direction by a first distance as a center, the second original image to obtain the second image, wherein the first direction and the first distance are determined according to a motion feature of the electronic device; and
wherein the first camera is a front-facing camera, and the second camera is a rear-facing camera; or the first camera is a telephoto camera, and the second camera is a middle-focus camera or a short-focus camera; or the first camera and the second camera are the same camera, and a zoom ratio of the first image is greater than a zoom ratio of the second image.

2. The method according to claim 1, wherein a size of the first viewfinder and a size of the second viewfinder are the same or different.

3. The method according to claim 1, wherein the cropping, by using a target object in a first original image acquired by the first camera as a center, the first original image to obtain the first image comprises:
cropping, by using the target object in the first original image acquired by the first camera as a center, the first original image to obtain a third image;
adjusting a zoom ratio corresponding to the first viewfinder according to the third image and a size of the first viewfinder, to obtain an adjusted zoom ratio; and
performing zoom processing according to the adjusted zoom ratio of the first viewfinder and the third image, to obtain the first image.

4. The method according to claim 1, wherein after the cropping, by using a target object in a first original image acquired by the first camera as a center, the first original image to obtain the first image, the method comprises:
cropping, by using the target object in the first original image acquired by the first camera as a center, the first original image to obtain the first image; and
adjusting a size of the first viewfinder according to a size of the first image.

5. The method according to claim 1, further comprising:
automatically determining, according to the first original image acquired by the first camera, the target object in the first original image; or determining the target object in the first original image according to a selection operation of a user.

6. The method according to claim 1, wherein the target object comprises one or more faces.

7. The method according to claim 6, wherein the cropping, by using a target object in a first original image acquired by the first camera as a center, the first original image to obtain the first image further comprises:
segmenting, by using an image segmentation technology, the first original image acquired by the first camera into a fourth image and a fifth image, wherein the fourth image is an image of the target object, and the fifth image is an image that does not comprise the target object in the first original image;
cropping the fourth image by using the target object in the fourth image as a center, to obtain a sixth image; and
cropping the fifth image by using a position to which a center of the fifth image is moved in the first direction by the first distance as a center, to obtain a seventh image; and
combining the sixth image and the seventh image to obtain the first image.

8. The method according to claim 1, wherein the electronic device is equipped with an inertial measurement unit (IMU), and the method further comprises:
determining the motion feature of the electronic device according to data of the IMU, and determining the first direction and the first distance according to the motion feature of the electronic device.

9. The method according to claim 8, wherein the second camera is further equipped with an optical image stabilization (OIS) device, and the determining the motion feature of the electronic device according to data of the IMU, and determining the first direction and the first distance according to the motion feature of the electronic device comprises:
determining the motion feature of the electronic device according to the data of the IMU, and determining the first direction and the first distance according to the motion feature of the electronic device and data of the OIS device.

10. The method according to claim 1, wherein the first operation is an operation of a user on a specific control, inputting a specific speech command, or performing a preset air gesture.

11. An electronic device, comprising: a processor, a memory, a touch screen, a first camera, and a second camera, wherein the memory, the touch screen, the first camera, and the second camera are coupled to the processor, the memory is stores computer program code, the computer program code comprises computer instructions, and the processor, when reading the computer instructions from the memory and executing the computer instructions, causes the electronic device to perform the following operations:
receiving a first operation;
displaying a first viewfinder and a second viewfinder in response to receiving the first operation, wherein the first viewfinder is configured to display a first image acquired by the first camera, and the second viewfinder is configured to display a second image acquired by the second camera;
cropping, by using a target object in a first original image acquired by the first camera as a center, the first original image to obtain the first image; and
cropping, by using a position to which a center of a second original image acquired by the second camera is moved in a first direction by a first distance as a center, the second original image to obtain the second image, wherein the first direction and the first distance are determined according to a motion feature of the electronic device; and
wherein the first camera is a front-facing camera, and the second camera is a rear-facing camera; or the first camera is a telephoto camera, and the second camera is a middle-focus camera or a short-focus camera; or the first camera and the second camera are the same camera, and a zoom ratio of the first image is greater than a zoom ratio of the second image.

12. The electronic device according to claim 11, wherein a size of the first viewfinder and a size of the second viewfinder are the same or different.

13. The electronic device according to claim 11, wherein the cropping, by using a target object in a first original image acquired by the first camera as a center, the first original image to obtain the first image comprises:
- cropping, by using the target object in the first original image acquired by the first camera as a center, the first original image to obtain a third image;
- adjusting a zoom ratio corresponding to the first viewfinder according to the third image and a size of the first viewfinder frame, to obtain an adjusted zoom ratio; and
- performing zoom processing according to the adjusted zoom ratio of the first viewfinder frame and the third image, to obtain the first image.

14. The electronic device according to claim 11, wherein after the cropping, by using a target object in a first original image acquired by the first camera as a center, the first original image to obtain the first image, the electronic device further performs:
- cropping, by using the target object in the first original image acquired by the first camera as a center, the first original image to obtain the first image; and
- adjusting a size of the first viewfinder according to a size of the first image.

15. The electronic device according to claim 11, wherein the processor, when reading the computer instructions from the memory and executing the computer instructions, causes the electronic device to further perform the following operations:
- automatically determining, according to the first original image acquired by the first camera, the target object in the first original image; or determining the target object in the first original image according to a selection operation of a user.

16. The electronic device according to claim 11, wherein the target object comprises one or more faces.

17. The electronic device according to claim 16, wherein the cropping, by using a target object in a first original image acquired by the first camera as a center, the first original image to obtain the first image further comprises:
- segmenting, by using an image segmentation technology, the first original image acquired by the first camera into a fourth image and a fifth image, wherein the fourth image is an image of the target object, and the fifth image is an image that does not comprise the target object in the first original image;
- cropping the fourth image by using the target object in the fourth image as a center, to obtain a sixth image; and
- cropping the fifth image by using a position to which a center of the fifth image is moved in the first direction by the first distance as a center, to obtain a seventh image; and
- combining the sixth image and the seventh image to obtain the first image.

18. The electronic device according to claim 11, wherein the electronic device is equipped with an inertial measurement unit (IMU), and the electronic device further performs:
- determining the motion feature of the electronic device according to data of the IMU, and determining the first direction and the first distance according to the motion feature of the electronic device.

19. The electronic device according to claim 18, wherein the second camera is further equipped with an optical image stabilization (OIS) device, and the determining the motion feature of the electronic device according to data of the IMU, and determining the first direction and the first distance according to the motion feature of the electronic device comprises:
- determining the motion feature of the electronic device according to the data of the IMU, and determining the first direction and the first distance according to the motion feature of the electronic device and data of the OIS device.

20. A non-transitory computer-readable storage medium, comprising computer instructions, wherein the computer instructions, when run on an electronic device comprising a first camera and a second camera, cause the electronic device to perform the following:
- receiving a first operation;
- displaying a first viewfinder and a second viewfinder in response to receiving the first operation, wherein the first viewfinder is configured to display a first image acquired by the first camera, and the second viewfinder is configured to display a second image acquired by the second camera;
- cropping, by using a target object in a first original image acquired by the first camera as a center, the first original image to obtain the first image; and
- cropping, by using a position to which a center of a second original image acquired by the second camera is moved in a first direction by a first distance as a center, the second original image to obtain the second image, wherein the first direction and the first distance are determined according to a motion feature of the electronic device; and
- wherein the first camera is a front-facing camera, and the second camera is a rear-facing camera; or the first camera is a telephoto camera, and the second camera is a middle-focus camera or a short-focus camera; or the first camera and the second camera are the same camera, and a zoom ratio of the first image is greater than a zoom ratio of the second image.

* * * * *